United States Patent
Tsukada et al.

(10) Patent No.: US 7,048,443 B2
(45) Date of Patent: *May 23, 2006

(54) SEALING DEVICE FOR LINEAR GUIDE APPARATUS

(75) Inventors: Toru Tsukada, Gunma (JP); Yutaka Igarashi, Gunma (JP); Soichiro Kato, Gunma (JP); Toshikazu Yabe, Kanagawa (JP); Fumio Ueki, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/115,341

(22) Filed: Apr. 27, 2005

(65) Prior Publication Data

US 2005/0190996 A1   Sep. 1, 2005

Related U.S. Application Data

(63) Continuation of application No. 10/712,306, filed on Nov. 14, 2003, now abandoned, which is a continuation of application No. 10/263,674, filed on Oct. 4, 2002, now Pat. No. 6,672,764, which is a continuation of application No. 09/875,272, filed on Jun. 7, 2001, now Pat. No. 6,550,968, which is a continuation of application No. 09/371,493, filed on Aug. 10, 1999, now Pat. No. 6,257,765, which is a continuation of application No. 08/678,765, filed on Jul. 11, 1996, now Pat. No. 6,019,513.

(30) Foreign Application Priority Data

Jul. 11, 1995   (JP)   ................................ P. 7-174741
Jul. 28, 1995   (JP)   ................................ P. 7-193671
Aug. 11, 1995   (JP)   ................................ P. 7-206190

(51) Int. Cl.
F16C 29/06   (2006.01)

(52) U.S. Cl. .......................................... 384/15; 384/45

(58) Field of Classification Search ............ 384/43–45, 384/15
See application file for complete search history.

(56) References Cited

U.S. PATENT DOCUMENTS

| | | | |
|---|---|---|---|
| 3,541,011 A | 11/1970 | Davis et al. |
| 3,547,819 A | 12/1970 | Davis et al. |
| 3,729,415 A | 4/1973 | Davis et al. |
| 4,239,632 A | 12/1980 | Baile |
| 4,491,373 A | 1/1985 | Sugi et al. |

(Continued)

FOREIGN PATENT DOCUMENTS

DE    3432197    2/1985

(Continued)

*Primary Examiner*—Thomas R. Hannon
(74) *Attorney, Agent, or Firm*—Sughrue Mion, PLLC

(57) ABSTRACT

In a linear guide apparatus including an axially extending guide rail, a slider engaged with the guide-rail, and a plurality of rolling elements loaded into the slider, the linear guide apparatus further includes a sealing device fixed to the slider in slidable contact with the guide rail for sealing a clearance existing between the guide rail and the slider, in which the sealing device includes a lubricant-containing polymer member formed of a synthetic resin containing a lubricant, and having a contact portion contacting with the guide rail to surround the guide rail, both wing portions, a connecting portion connecting the wing portions to be C-shaped substantially, and a pair of first recesses formed in the respective wing portions for fixing the lubricant-containing polymer member to the slider; a first plate member fitted to the lubricant-containing polymer member opposed to the slider; and a pair of first cylindrical members inserted to the respective first recesses.

9 Claims, 31 Drawing Sheets

U.S. PATENT DOCUMENTS

| | | |
|---|---|---|
| 4,886,376 A | 12/1989 | Osawa |
| 4,963,038 A | 10/1990 | Asano et al. |
| 5,149,205 A | 9/1992 | Tsukada |
| 5,186,544 A | 2/1993 | Eder et al. |
| 5,325,732 A | 7/1994 | Vogel |
| 5,399,023 A | 3/1995 | Winkelmann et al. |
| 5,492,413 A | 2/1996 | Tsukada |
| 5,494,354 A | 2/1996 | Tsukada |
| 5,547,285 A | 8/1996 | Hutzel et al. |
| 5,694,811 A | 12/1997 | Tsukada |
| 5,769,543 A | 6/1998 | Tsukada et al. |
| 5,967,667 A | 10/1999 | Yatsu |
| 6,019,513 A | 2/2000 | Tsukada et al. |

FOREIGN PATENT DOCUMENTS

| | | |
|---|---|---|
| DE | 9317161 | 2/1994 |
| DE | 4334776 | 4/1994 |
| DE | 4435759 | 4/1995 |
| EP | 0629788 | 12/1994 |
| JP | 47-3455 | 1/1972 |
| JP | 473455 | 1/1972 |
| JP | 58193182 | 12/1983 |
| JP | 62134957 | 8/1987 |
| JP | 63-23239 | 5/1988 |
| JP | 6399062 | 6/1988 |
| JP | 63-145020 | 9/1988 |
| JP | 2-41719 | 3/1990 |
| JP | 4-46216 | 2/1992 |
| JP | 5-172139 | 7/1993 |
| JP | 7-35146 | 2/1995 |
| JP | 7-54844 | 2/1995 |
| JP | 7-25335 | 5/1995 |
| JP | 10-184683 | 7/1998 |
| JP | 11-294451 | 10/1999 |
| WO | WO 99/56026 | 11/1999 |

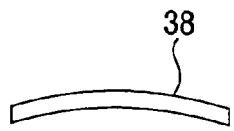
FIG. 25A
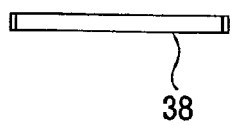
FIG. 25B
FIG. 26A
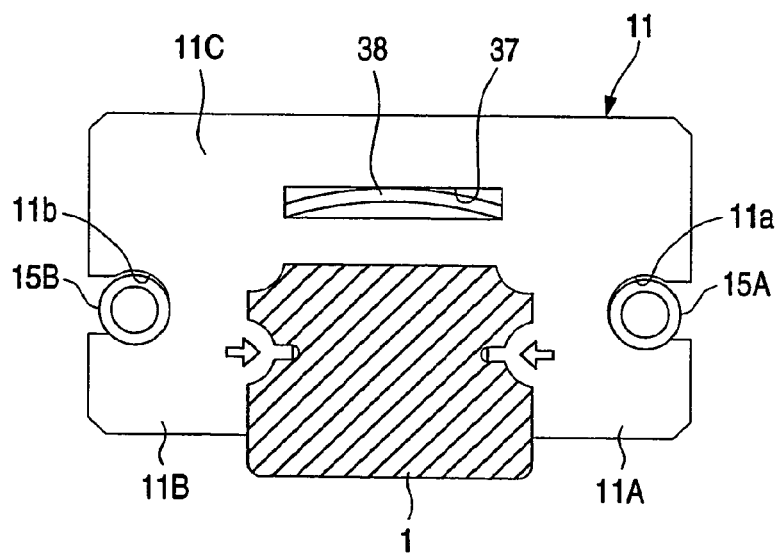
FIG. 26B
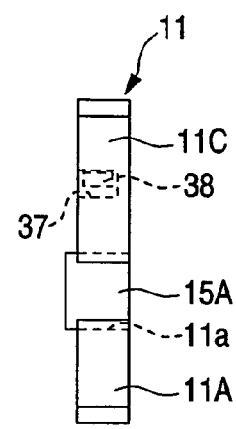

SEALING DEVICE FOR LINEAR GUIDE APPARATUS

This is a continuation of application Ser. No. 10/712,306 filed Nov. 14, 2003, now abandoned which is a continuation of application Ser. No. 10/263,674 filed Oct. 4, 2002, which issued into U.S. Pat. No. 6,672,764 on Jan. 6, 2004, which is a continuation of application Ser. No. 09/875,272 filed Jun. 7, 2001, which issued into U.S. Pat. No. 6,550,968 on Apr. 22, 2003, which is a continuation of application Ser. No. 09/371,493, filed Aug. 10, 1999, which issued into U.S. Pat. No. 6,257,765 on Jul. 10, 2001, which is a continuation of application Ser. No. 08/678,765, filed Jul. 11, 1996, which issued into U.S. Pat. No. 6,019,513 on Feb. 1, 2000. The entire disclosures of the prior applications, application Ser. Nos. 10/712,306, 10/263,674, 09/875,272, 09/371,493, and 08/678,765 are considered part of the disclosure of the accompanying continuation application and is hereby incorporated by reference.

BACKGROUND OF THE INVENTION

The present invention relates to a linear guide apparatus, and more particularly relates to a sealing device for a linear guide apparatus which lubricant can be stably fed to the rolling elements over a long period of time.

Further, the present invention relates to a linear guide apparatus, and more particularly relates to a linear guide apparatus, to the lip portion of the sealing device of which lubricant can be automatically fed, so that the life of the sealing device can be prolonged.

A first conventional example will be described as follows. An example of the conventional linear guide apparatus, which is commonly used, is shown in FIG. 37. This conventional linear guide apparatus includes: a guide rail 1 extending in the axial direction, on the outer surface of which a rolling element rolling groove 3 is formed; and a slider 2 incorporated to the guide rail 1 in such a manner that the slider 2 strides the guide rail 1. The slider 2 is composed of a slider body 2A and end caps 2B attached to both ends of the slider body 2A. On inner side surfaces of both wing portions 4 of the slider body 2A, there are provided rolling element rolling grooves (not shown in the drawing) which are opposed to the rolling element rolling groove 3 formed on the guide rail 1. Also, in the slider body 2A, there are provided rolling element returning paths (not shown) which penetrate thick portions of the wing portions of the slider body 2A. On the other hands, the end caps 2B have curved paths (not shown) which communicate the rolling element rolling grooves of the slider body 2A with the rolling element returning paths formed in parallel to the rolling element rolling grooves. In this way, a circulation circuit of the rolling elements is formed by the rolling element rolling grooves, the rolling element returning paths and the curved paths formed on both sides. For example, a large number of rolling elements composed of steel balls are charged into the circulation circuit in which the rolling elements are circulated.

The slider 2 incorporated to the guide rail 1 is smoothly moved along the guide rail 1 when the rolling elements are rolling in both rolling element grooves which are opposed to each other. While the rolling elements are rolling in this way, they circulate endlessly in the rolling element circulation passages formed in the slider.

As a sealing device to seal an opening between the slider 2 and the guide rail 1 for the purpose of dust protection, as shown in FIG. 38, there are provided side seals 5 on both ends (end faces of the end caps 2B), and also there is provided an under seal 6 on the lower surface of the slider 2. Conventionally, these seals are made of rubber such as NBR (acrylonitrile butadiene rubber). In this connection, reference numeral 7 in FIG. 37 is a grease nipple.

A second conventional example of the linear guide apparatus is disclosed in Unexamined Japanese Patent Publication No. Hei. 6-346919 previously proposed by the present applicant. A third conventional example of the linear guide apparatus is disclosed in Unexamined Japanese Patent Publication No. Hei. 7-35146 previously proposed by the present applicant.

The second conventional example will be described as follows. Between the outer surface of the guide rail and the inner surface of the slider moving along the guide rail, there is provided a seal device having a seal lip portion made of rubber or synthetic resin containing lubricant. The seal lip portion comes into contact with an outer surface of the guide rail and seals a gap formed between the inner surface of the slider and the outer surface of the guide rail. Since the seal lip portion of the seal device is made of rubber or synthetic resin containing lubricant so that the seal lip portion has a self-lubricating property, the lubricant contained in the seal gradually oozes out and is automatically fed to a frictional surface of the seal portion. Therefore, the abrasion of the seal lip portion can be suppressed.

The third conventional example will be described as follows. At least a portion of the layer made of rubber or synthetic resin and a portion of the layer made of rubber or synthetic resin containing lubricant are overlapped and integrally joined. At least, on the layer of rubber or synthetic resin containing lubricant, there is formed a seal lip portion which comes into contact with an outer surface of the guide rail so as to seal a gap formed between the inner surface of the slider and the outer surface of the guide rail. Since the seal lip portion also has a self-lubricating property in this third conventional example, lubricant contained in the seal itself gradually oozes out and is fed to a frictional surface of the seal, so that the abrasion of the lip portion can be suppressed. Since the layers are overlapped as described above in the third conventional example, it is possible to provide the following advantages. When the number and thickness of the overlapped layers are appropriately determined, the mechanical strength of the seal lip portion can be arbitrarily set in accordance with the use of the linear guide apparatus.

As shown in FIGS. 52 to 52B, the sealing device of the second conventional example is described as follows. Lubricant is made to ooze from a surface of the guide rail 1 by the action of contact resistance of the seal 5. Accordingly, there is provided no relief 73 as shown in FIG. 53A in the contact portion 71 shown in FIG. 53B where the seal 5 comes into contact with the guide rail 1, but an area of the portion where the seal 5 comes into contact with the guide rail 1 is increased. Further, there is formed a recessed groove 72 in the contact portion 71 where the seal 5 comes into contact with the guide rail 1, so that the portion 71 is divided into two portions. Then the thus divided portions are contacted with the guide rail 1 by two steps. Therefore, the intrusion of foreign objects can be prevented by the contact of two steps better than the contact of one step. Further, lubricant can be held by the recessed groove 72, so that the sliding property of the seal 5 can be enhanced.

However, the above conventional linear guide apparatus has the following disadvantages.

As the slider 2 runs along the guide rail 1, a quantity of grease previously charged inside the slider 2 is decreased.

Therefore, the lubrication between the lip portion of the side seal 5 and the guide rail 1 becomes poor, and also the lubrication between the lip portion of the under seal 6 and the guide rail 1 becomes poor. Due to the poor lubrication, the lip portions gradually wears away. Due to the progress of abrasion, the sealing property is deteriorated, and foreign objects such as cutting chips enter the inside of the slider 2, which shortens the life of the linear guide apparatus in some cases.

When the slider 2 runs and the rolling elements roll, grease can be fed to the rolling element rolling groove 3 of the guide rail 1 via the rolling elements. Accordingly, the abrasion is relatively small in a portion of the lip which comes into contact with the rolling element rolling groove 3. On the other hand, the abrasion tends to increase in a portion of the lip which comes into contact with an upper surface of the rail to which no grease is fed because of poor lubrication. Due to the foregoing, the lip portion wears away and damaged. In this way, the life of the linear guide apparatus is shortened.

From this point of view, when the above second example and the third one are adopted, the abrasion of the seal lip portion can be suppressed since the seal lip portion has a self-lubricating property. However, even in the above conventional examples, the following problems may be encountered. A quantity of lubricant oozing from rubber or synthetic resin containing lubricant is not sufficient to lubricate the balls and rollers which guide the movement of the slider of the linear guide apparatus, that is, it is difficult to maintain smooth rolling motions of the rolling elements such as balls and rollers.

In the sealing device containing lubricant of the above second conventional example or the third one, the seal lip portion is pressed against the guide rail only by the elasticity of the seal itself. Accordingly, it is possible to provide a sufficiently high pressing force as a seal, however, it is impossible to provide a sufficiently high pressing force as a lubricant feed unit.

Further, a shape of each portion of the guide rail 1 with which the seal 11 comes into contact, for example, a shape of the ball rolling groove, the guide rail side surface or the upper surface of the guide rail is complicated, and further the seal 11 is attached being a little displaced. Therefore, it is difficult for the seal 11 to be positively contacted with each portion of the guide rail 1. Accordingly, a sufficient quantity of lubricant can not be provided and the dust protecting property is deteriorated. As a result, the lubricant in the slider 2 is widely diffused.

SUMMARY OF THE INVENTION

The present invention has been accomplished to solve problems caused in a conventional linear guide apparatus. An object of the present invention is to provide a linear guide apparatus in which the abrasion of a sealing device is reduced by directly feeding lubricant to the lip portion or by feeding lubricant via the guide rail, so that a high sealing property can be maintained in the linear guide apparatus over a long period of time.

Another object of the present invention is to provide a linear guide apparatus in which lubricant can be fed at all times so as to maintain a smooth rolling motion of the rolling elements.

Still another object of the present invention is to provide a linear guide sealing device in which the seal can be positively contacted with each portion while the seal precisely follows the shape of each portion.

The objects of the invention are achieved by a linear guide apparatus which includes: an axially extending guide rail having a first rolling groove on its outer surface; a slider engaged with the guide rail and having a second rolling groove, rolling element return grooves and curved grooves, the second rolling groove confronting the first rolling groove, the rolling element return grooves being coupled to both end portions of the second rolling groove through the curved grooves, respectively; a plurality of rolling elements loaded into the slider to be made circulatable through the second rolling groove, the curved grooves, and the rolling element return grooves; and a sealing device fixed to the slider in slidable contact with the guide rail for sealing a clearance existing between the guide rail and the slider, the sealing device comprising: a lubricant-containing polymer member formed of a synthetic resin contfaining a lubricant, and having a contact portion contacting with the guide rail to surround the guide rail, both wing portions, a connecting portion connecting the wing portions to be C-shaped substantially, and a first plate member fitted to the lubricant-containing polymer member in which the lubricant-containing polymer member is interposed between the slider and the first plate member.

According to the invention, since a lubricant-containing polymer member is arranged close to the lip portion of a side seal which is provided in the sealing device, lubricant that has gradually oozed from the lubricant-containing polymer member is easily fed to the lip portion, so that the lip portion can be stably lubricated over a long period of time.

In addition, since at least a portion of the inner circumferential surface of the lubricant-containing polymer member comes into contact with the outer circumferential surface of the guide rail, the lip portion can be fed with lubricant via the guide rail. Therefore, it is possible to feed lubricant to the lip portion very stably. Accordingly, the abrasion of the lip portion can be minimized, and the sealing property of the sealing device can be maintained to be high over a long period of time.

Lubricant that has oozed from the lubricant-containing polymer member is also fed to the rolling elements via the guide rail. Accordingly, even when grease is exhausted from the apparatus for some reasons, the lubricant that has oozed out from the lubricant-containing polymer member functions as a lubricant of the linear guide apparatus itself.

Especially when the lubricant-containing polymer member is interposed between the slider end face and the side seal, the leakage of grease from the device can be reduced. The reason is described as follows. Conventionally, the lip portion of the sealing device gets rolled up during a normal reciprocating motion of the slider. At this time, grease leaks out from the device. On the other hand, according to the invention, the lubricant-containing polymer member is interposed between the slider end face and the side seal. Therefore, the lip portion is difficult to get rolled up, and the leakage of grease from the device can be reduced. In the case where the side seal is composed of a polyurethane rubber member containing grease which works as lubricant, the abrasion of the lip portion of the sealing device can be further reduced.

Further, according to the invention, when lubricant oozes from the lubricant-containing member which strides the guide rail, the lubricant-containing member shrinks by itself, so that a distance between both wing portions of the lubricant-containing member, which is arranged in a C-shape, is reduced, and further the inside faces of both wing portions of the lubricant-containing member, that is, the faces opposed to the side faces of the guide rail, are pushed against the guide rail. Therefore, the lubricant-containing member comes into contact with the guide rail at all times. Due to the pushing force generated by the pushing means, no gap is formed between the guide rail and the lubricant-containing member irrespective of errors caused in the manufacturing process. Therefore, the lubricant oozing from the lubricant-containing member can be stably fed to the guide rail. Particularly, the shape of the bottom surface of the C-shaped lubricant-containing member is formed into a predetermined shape of an arc. Therefore, even when the lubricant-containing member is deformed by the pushing force of the pushing means so that both wing portions are pressed against the guide rail, the shape of the arc on the bottom surface is put into a horizontal condition. Consequently, the lubricant-containing member stably comes into contact with the guide rail.

Moreover, according to the invention, a plurality of cutout portions are formed in a portion of the seal lip which comes into pressure contact with an outer surface of the guide rail. Therefore, the seal lip in which a plurality of cutout portions are formed can be contacted with the outer surface of the guide rail, the shape of which is complicated. In this way, the seal lip can easily follow the shape of the guide rail. Even when the lubricant feed device is dislocated in the assembling process, the seal lip having the cutout portions is deformed, so that the dislocation can be absorbed, and no gap is formed between the seal lip portion and the guide rail.

When a plurality of cutout portions are formed in the seal lip portion, the contact area of the seal lip portion with the guide rail can be increased, so that a quantity of lubricant oozing from the seal lip portion can be increased. When the seal lip portion is provided with a plurality of cutout portions, a space in which the lubricant is held can be increased as compared with a conventional arrangement. Therefore, the sliding property of the seal lip portion can be enhanced. Further, the number of the seal lip portions is increased as compared with a conventional arrangement, so that the intrusion of dirt and dust from the outside can be prevented, and the lubricant can be prevented from diffusing to the outside.

BRIEF DESCRIPTION OF THE DRAWINGS

FIGS. 25A and 25B are views showing an arrangement of the elastic body of the eighth embodiment;

FIGS. 26A and 26B are schematic illustrations showing an assembling condition of the eighth embodiment;

DETAILED DESCRIPTION OF THE PREFERRED EMBODIMENTS

Figure 1:
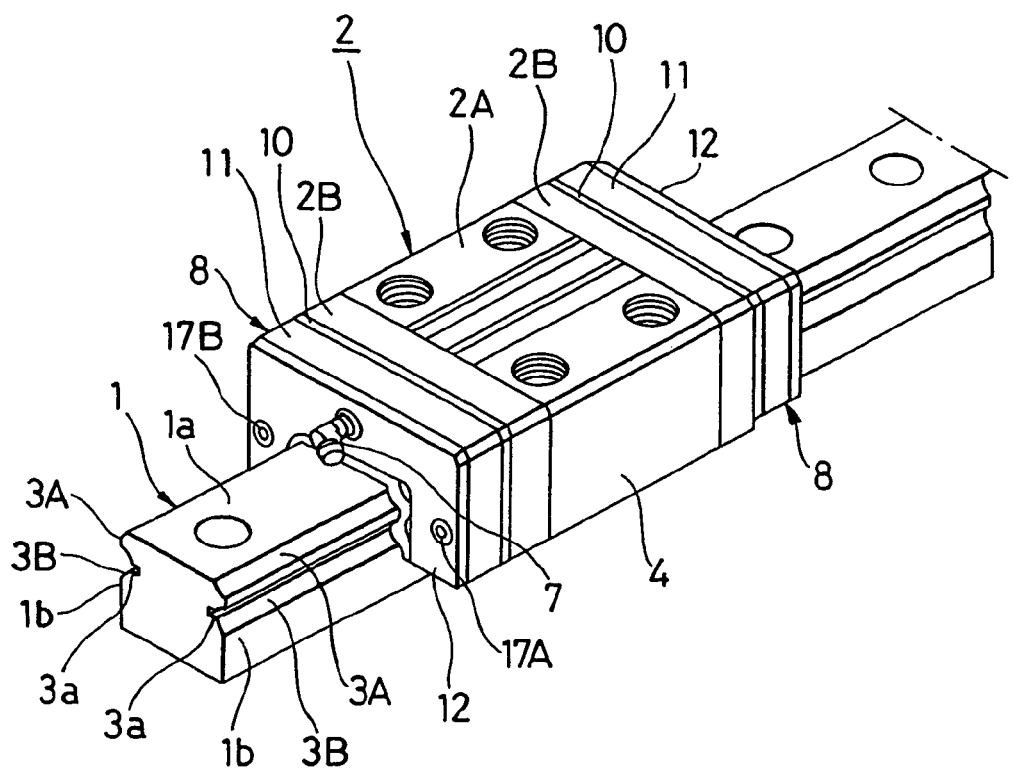
FIG. 1 is a perspective view of the linear guide apparatus of a first embodiment of the present invention.

Detailed explanations will be made below for the material of the lubricant-containing member of the present invention.

In the case of a member made of rubber in which lubricant is contained, for example, it is possible to use polyurethane rubber that has been cured under the condition that it contains grease.

Polyurethane rubber is a compound formed by the reaction of polyisocyanate and active hydrogen compound. Examples of usable polyisocyanate are: tolylenediisocyanate, hexamethylene diisocyanate, and so forth.

Examples of usable active hydrogen compounds are: hydrocarbon such as polybutadiene; polyether such as polyoxypropylene; long link active hydrogen compound such as castor oil, polyester and polycarbonate; polyhydroxy compound such as water and ethylene glycol; and short link active hydrogen compound such as aminoalcohol and polyamino compound.

An example of usable grease is common grease such as mineral oil lithium soap grease.

Next, the lubricant-containing member in which lubricant is contained in synthetic resin is formed as follows. Lubricant of paraffin hydrocarbon oil such as poly-α-olefin oil, ether oil such as naphthene hydrocarbon oil, mineral oil and dialkyl diphenyl ether oil, and ester oil such as ester of phthalic acid is singly mixed with synthetic resin or alternatively mixed with synthetic resin in the form of mixed oil. In this case, the synthetic resin is selected from a group of polyolefin resins having the same chemical structure such as polyethylene, polypropylene, polybutylene and polymethyl pentene. Material obtained in this way is subjected to injection molding so as to mold the lubricant-containing member. Various addition agents such as an antioxidant, rust preventive agent, antiabrasion agent, deforming agent and extreme pressure agent may be previously added into the lubricant.

In this case, a ratio of composition of the above lubricant-containing member is as follows. With respect to the total weight, polyolefin resin is 20 to 80% by weight, and lubricant is 80 to 20% by weight. When the polyolefin resin is smaller than 20% by weight, it is impossible to obtain a predetermined level of hardness or mechanical strength. When polyolefin resin exceeds 80% by weight, that is, lubricant is smaller than 20% by weight, a quantity of lubricant to be fed is decreased, so that the abrasion reducing effect of the lip portion of the sealing device is deteriorated. Further, the polyolefin resin is preferably 20 to 50% by weight and the lubricant is preferably 80 to 50% by weight because the supply of the lubricant increases so that it can further raises the abrasion reducing effect of the lip portion of the sealing device.

Basic structures of the above group of synthetic resins are the same and their average molecular weights are different from each other. Values of the average molecular weights are in a range from $1\times10^3$ to $5\times10^6$. Synthetic resin of relatively low molecular weight, the average molecular weight of which is $1\times10^3$ to $1\times10^6$, and synthetic resin of extremely high molecular weight, the average molecular weight of which is $1\times10^6$ to $5\times10^6$, are singly used, or used being mixed with each other, if necessary.

In order to enhance the mechanical strength of the lubricant-containing member of the present invention, the following thermoplastic resins and thermosetting resin may be added to the above polyolefin resins.

Examples of usable thermoplastic resins are: polyamide, polycarbonate, polybutylene terephthalate, polyphenylene sulfide, polyether sulfone, polyether etherketone, polyamideimide, polystyrene, and ABS resin.

Examples of usable thermosetting resins are: unsaturated polyester resin, urea formaldehyde resin, melamine resin, phenol resin, polyimide resin, and epoxy resin.

These resins may be singly used. Alternatively, these resins may be used being mixed with each other.

In order to disperse polyolefin resin and other resins more uniformly, an appropriate compatibilizer may be added, if necessary.

In order to enhance the mechanical strength, a filler may be added. Examples of usable fillers are: calcium carbonate, magnesium carbonate, inorganic wiskers such as potassium titanate wiskers and aluminum borate wiskers, inorganic fiber such as glass fiber, asbestos and metallic fiber, and cloth woven from these fibers. Concerning inorganic compounds, carbon black, graphite powder, carbon fiber, aramid fiber and polyester fiber may be added.

In order to prevent the deterioration of polyolefin resin caused by heat, an age resistor such as N,N'-diphenyl-P-phenylenediamine, 2,2'-methylenebis (4-ethyl-6-t-butyl phenol) may be added. In order to prevent the deterioration of polyolefin resin caused by light, an ultraviolet ray absorbing agent such as 2-hydroxy-4-n-octoxy benzophenone and 2-(2'-hydroxy-3'-third-butyl-5'-methyl-phenyl)-5-chlorobenzotriazole may be added.

In order to maintain the feeding capacity of lubricant, it is preferable that a quantity of addition agent (polyolefin+ compound except for oil) is not more than 20% by the weight of the overall material used for molding.

Next, referring to the accompanying drawings, a first embodiment of the present invention will be explained below.

As shown in FIG. 1, which is a perspective view of the linear guide apparatus of the first embodiment of the invention, the linear guide apparatus includes: a guide rail 1 extending in the axial direction, on the outer surface of which rolling element rolling grooves 3A, 3B are formed; and a slider 2 incorporated to the guide rail 1 in such a manner that the slider 2 strides the guide rail 1.

The specific structure of the guide rail 1 is described as follows. On the ridge line where an upper surface 1a of the guide rail 1 crosses both side surfaces 1b, one rolling element rolling groove 3A is formed, the section of which is a substantial ¼ arc, and the rolling element rolling groove 3A extends in the axial direction of the guide rail 1. At an intermediate position on both side surfaces of the guide rail 1, the other rolling element rolling groove 3B is formed, the section of which is substantially semicircular. At the bottom of the rolling element rolling groove 3B, there is formed a run-off-groove 3a for a retainer to prevent the rolling elements from falling off when the slider 2 is not incorporated to the guide rail 1.

Figure 2:
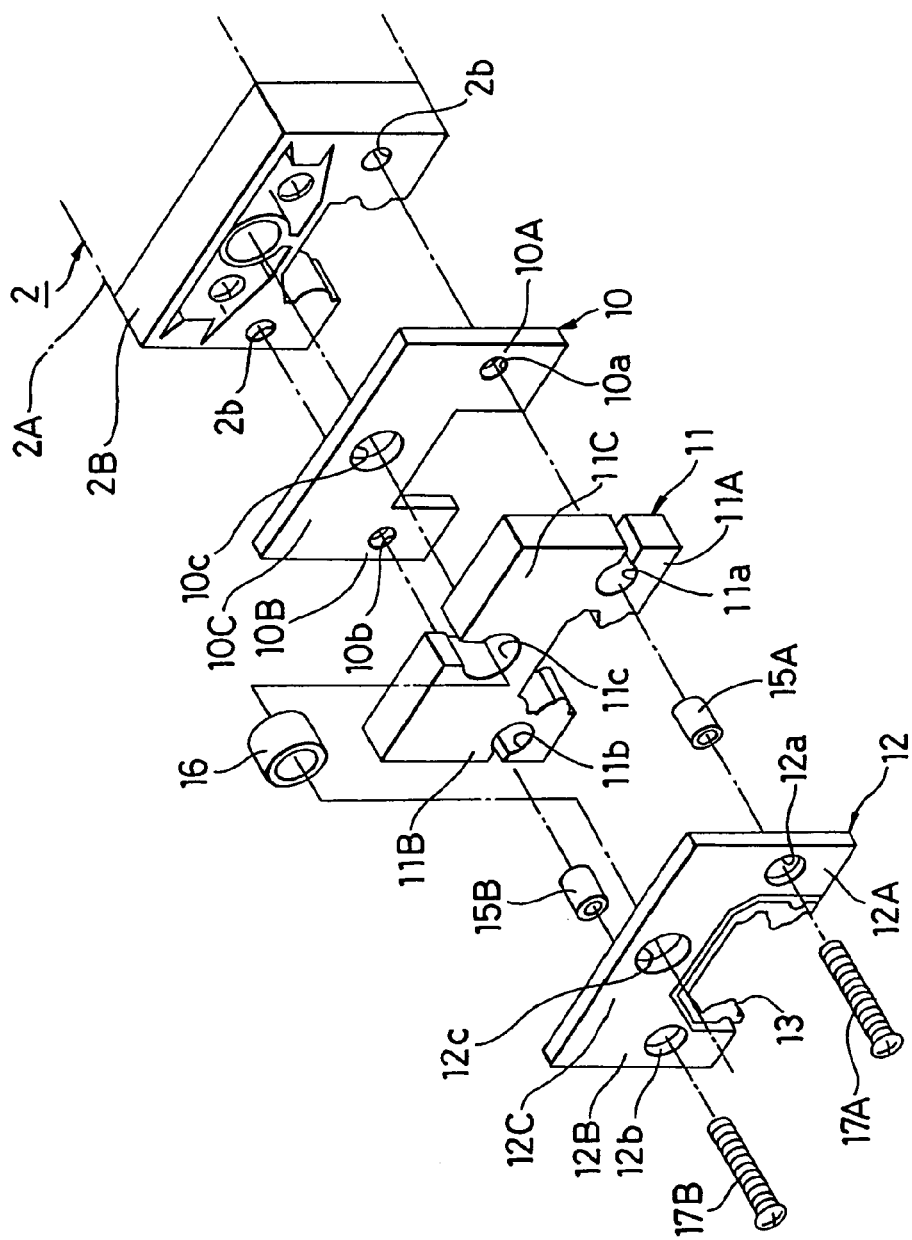
FIG. 2 is a perspective view showing a condition in which each member of a sealing device is attached to the end portion of the linear guide apparatus.

An end cap 2B is a molding of synthetic resin manufactured by injection molding, and the section of the end cap 2B is a substantial C-shape. As shown in FIG. 2, which is a perspective view showing an assembling condition of the end portion of the slider 2, on the outside of both end caps 2B, there are provided a sealing device 8 including a reinforcing plate 10 which is a plate-shaped member, a lubricant-containing member 11, and a side seal 12 which is a plate-shaped member, wherein they are arranged in the above order from the side of the end cap 2B and fixed to the end cap 2B being stacked to each other.

The reinforcing plate 10 is a C-shaped steel plate, the outer configuration of which is the same as that of the end cap 2B. In both wing portions 10A, 10B of the reinforcing plate 10, there are formed through-holes 10a, 10b through which attaching screws penetrate. In a connecting portion 10C that connects both wing portions 10A and 10B, there is formed a through-hole 10c through which a grease nipple is attached. In this connection, this reinforcing plate 10 is not contacted with the guide rail 1.

Figure 34:
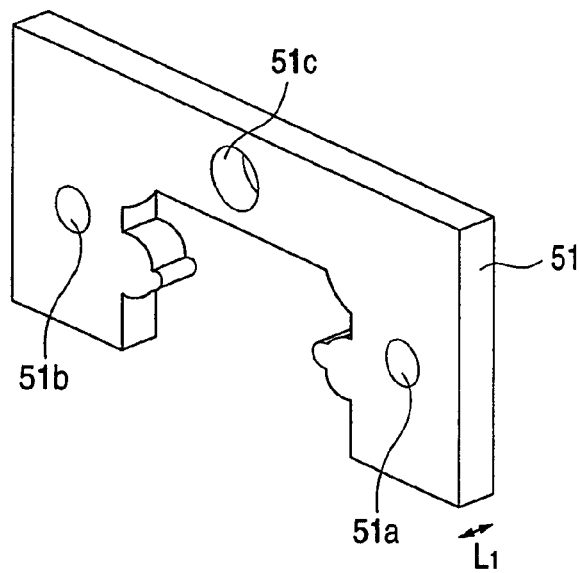
FIG. 34 is a perspective view of the lubricant-containing polymer member of the first embodiment of the present invention.
Figure 35:
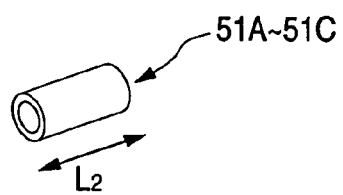
FIG. 35 is a perspective view of the sleeve inserted into the lubricant-containing polymer member.
Figure 36:
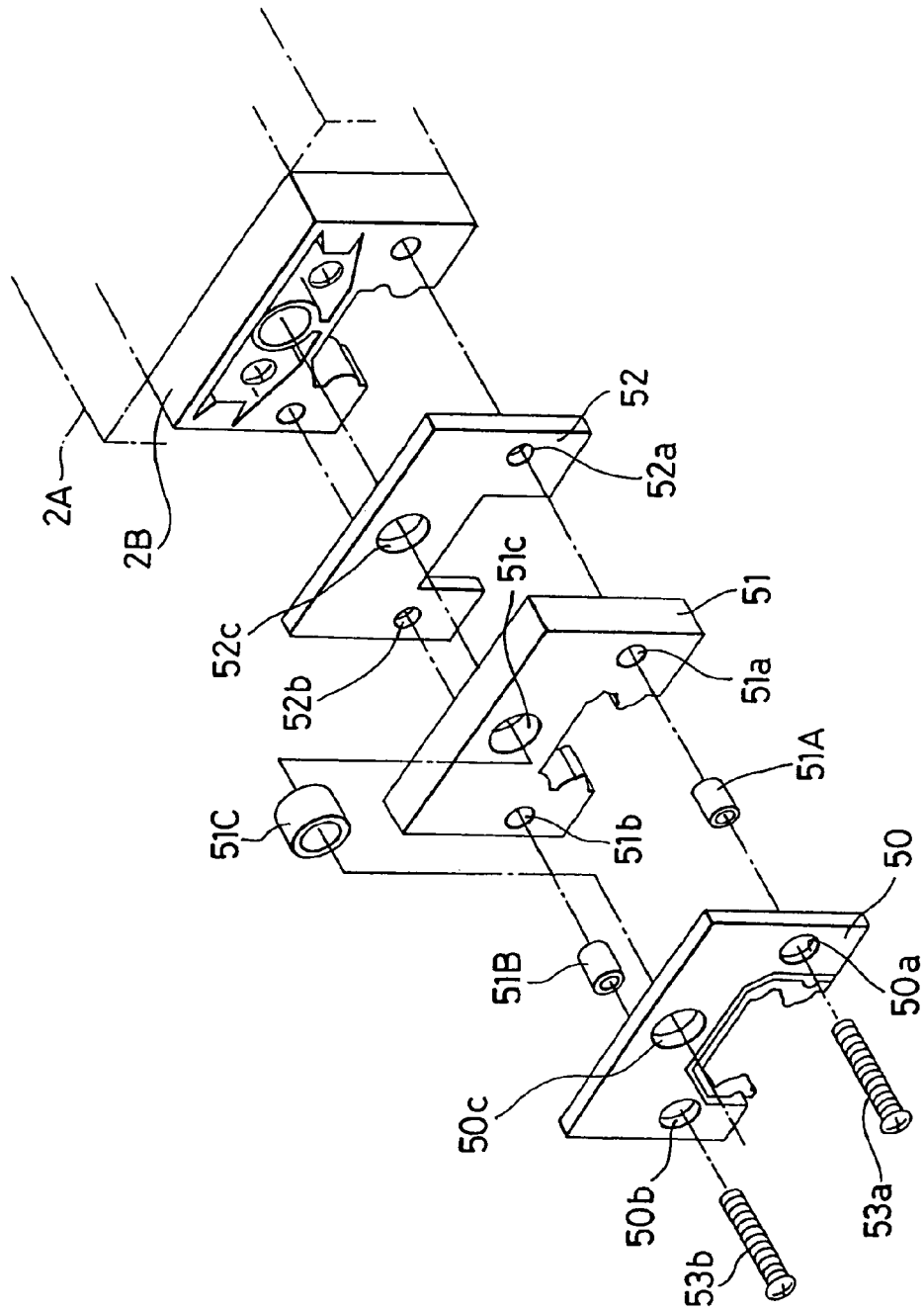
FIG. 36 is a perspective view showing an attaching condition of each member of a sealing device of the linear guide apparatus end portion.

The first embodiment of the present invention is shown in FIGS. 34 to 36 in more detail. The sealing device 8 includes a side seal 50 which is composed in such a manner that a sheet of grease-containing polyurethane rubber is made to adhere onto a C-shaped steel plate, the outer shape of which is substantially the same as that of the end cap 2B, or alternatively a sheet of NBR rubber is made to adhere onto a C-shaped steel plate. An inside face of the C-shaped side seal 50 is formed into a shape so that the side seal 50 can slidably come into contact with an upper face 1a and an outer side face 1b of the guide rail 1 so as to seal a gap between the slider 2 and the guide rail 1. However, in order to positively seal the gap between the slider 2 and the guide rail 1, the size of the inner face of the side seal 50, which comes into contact with the surface of the guide rail 1, is determined to be a little smaller than the size of the surface of the guide rail 1 by 0.1 to 0.2 mm.

As shown in the perspective view of FIG. 36, the sealing device 8 further includes a reinforcing plate 52 and a lubricant-containing polymer member 51 which is interposed between the side seal 50 and the reinforcing plate 52 and which is formed into a substantial C-shape which is the same as the outer shape of the end cap 2B. The inside face of the C-shape of the lubricant-containing polymer member 51 is formed in accordance with the sectional shape of the guide rail 1, and it is not contacted with the upper face 1a and the outer side face 1b of the guide rail 1, or at least a portion of the inside face of the C-shape of the lubricant-containing polymer member 41 is slidably contacted with the upper face 1a and the outer side face 1b of the guide rail 1.

In the lubricant-containing polymer member 51, there are formed through-holes 51a, 51b through which attaching screws penetrate when the lubricant-containing polymer member 51 is attached to the main body 2A, and there is also formed a through-hole 51c through which the grease nipple 7 is attached. Into the through-holes 51a, 51b and 51c, pipe-shaped sleeves 51A, 51B and 51C shown in FIG. 35 are inserted. The grease nipple 7 penetrates the inside of the sleeve 51C. In this connection, the length $L_2$ of these sleeves 51A, 51B, 51C is the same as the thickness $L_1$ of the lubricant-containing polymer member 51, or alternatively the length $L_2$ of these sleeves 51A, 51B, 51C is made to be a little longer than the thickness $L_1$ of the lubricant-containing polymer member 51 (by about 0.2 mm).

Outer diameters of the sleeves 51A, 51B are made to be larger than the diameters of the through-holes 50a, 50b of the side seal 50 and the diameters of the through-holes 52a, 52b of the reinforcing plate 52. Due to the foregoing arrangement, when the lubricant-containing polymer member 51 is interposed between the side seal 50 and the reinforcing plate 52 and fastened by the attaching screws 53a, 53b, the pushing force is not given to the lubricant-containing polymer member 51, so that the self-shrinking action of the lubricant-containing polymer member 51 can not be obstructed.

As shown in a perspective view of FIG. 36, the side seal 50, the lubricant-containing polymer member 51 and the reinforcing plate 52 of the sealing device 8 are integrally fixed to the main body 2A together with the end cap 2B when the attaching screws 53a, 53b penetrate the through-holes 50a, 50b of the side seal 50, the through-holes 51a, 51b of the lubricant-containing polymer member 51, and the through-holes 52a, 52b of the reinforcing plate 52. In this connection, reference numeral 50c is a through-hole formed on the side seal 50 through which the grease nipple 7 is attached, and reference numeral 52c is a through-hole formed on the reinforcing plate 52 through which the grease nipple 7 is attached.

Next, the mode of operation of the first embodiment will be explained as follows.

In the first embodiment, a gap formed between the opposed surfaces of the guide rail 1 and the slider 2 is sealed by the side seal 50. Therefore, unless the side seal 50 wears away, it is possible to perfectly prevent the entrance of dirt and dust into the gap from the front and the rear of the slider 2.

When the slider 2 moves on the guide rail 1 fixed to the mount, while the rolling elements B are rolling in the load rolling element rolling path 21 (22), they move in the slider moving direction at a speed lower than the moving speed of the slider and make a U-turn at the curved path on one end side. After that, while the rolling elements B are rolling in the rolling element return path 23 (24) in the reverse direction, they make a reverse U-turn in the curved path on the other end side. Then, the rolling elements B return to the load rolling element rolling path 21 (22). In this way, the rolling elements B circulate in the rolling paths.

When the linear guide apparatus is driven as described above, the lubricant-containing polymer member 51 is also moved while it is contacted or not contacted with the guide rail 1. Therefore, lubricant gradually oozes from the lubricant-containing polymer member 51. Since the lubricant-containing polymer member 51 is arranged close to the lip portion of the side seal 50 (the inner surface of the side seal 50 which comes into contact with the guide rail 1), the lip portion of the side seal 50 is stably lubricated by this oozing lubricant over a long period of time. In an arrangement in which the lubricant-containing polymer member 51 comes into contact with the guide rail 1, lubricant can be fed to the lip portion of the side seal 50 via the surface of the guide rail 1. Accordingly, lubricant can be more stably fed to the lip portion in this arrangement.

Due to the foregoing, the abrasion of the lip portion of the side seal 50 can be minimized. Therefore, the sealing property of the side seal 50 can be maintained over a long period of time, and the entrance of dirt and dust into the main body 2A can be prevented. As a result, the life of the linear guide apparatus can be prolonged.

Further, the lubricant that has oozed from the lubricant-containing polymer member 51 is automatically fed to the rolling elements B, which are rolling in the rolling grooves 3, 13, via the rolling grooves 3, 13. Due to the self-lubricity described above, it is possible for the apparatus to be smoothly operated over a long period of time. Accordingly, even if lubricant is not fed to the slider 2 from the outside of the apparatus, operation can be smoothly continued over a long period of time under the condition of low resisting torque.

In an arrangement in which the lubricant-containing polymer member 51 comes into contact with the guide rail 1, as the lubricant oozes from the lubricant-containing polymer member 51, the lubricant-containing polymer member 51 shrinks by itself. By the shrinking force, the lubricant-containing polymer member 51 closely comes into contact with the surface of the guide rail 1 to be sealed. Therefore, the lubricant-containing polymer member 51 performs both the sealing function and the lubricating function.

When the side seal 50 is made of polyurethane rubber that has been cured under the condition it contains grease, lubricant is fed by the side seal 50 itself. Therefore, the abrasion of the lip portion of the side seal 50 can be more reduced by the lubricant fed by the side seal 50 itself.

Since the lubricant-containing polymer member 51 is interposed between the end cap 2B and the side seal 50 via the reinforcing plate 52, the lip portion of the sealing 50 seldom gets rolled up during the reciprocating motion of the slider 2. Accordingly, it is possible to prevent the leakage of grease from the slider 2.

When the arrangement of the first embodiment is adopted, the grease nipple attaching hole may be closed with a blank plug. However, when necessary, this hole may be opened at an appropriate time, so that lubricant such as grease can be fed into the slider.

Figure 37:
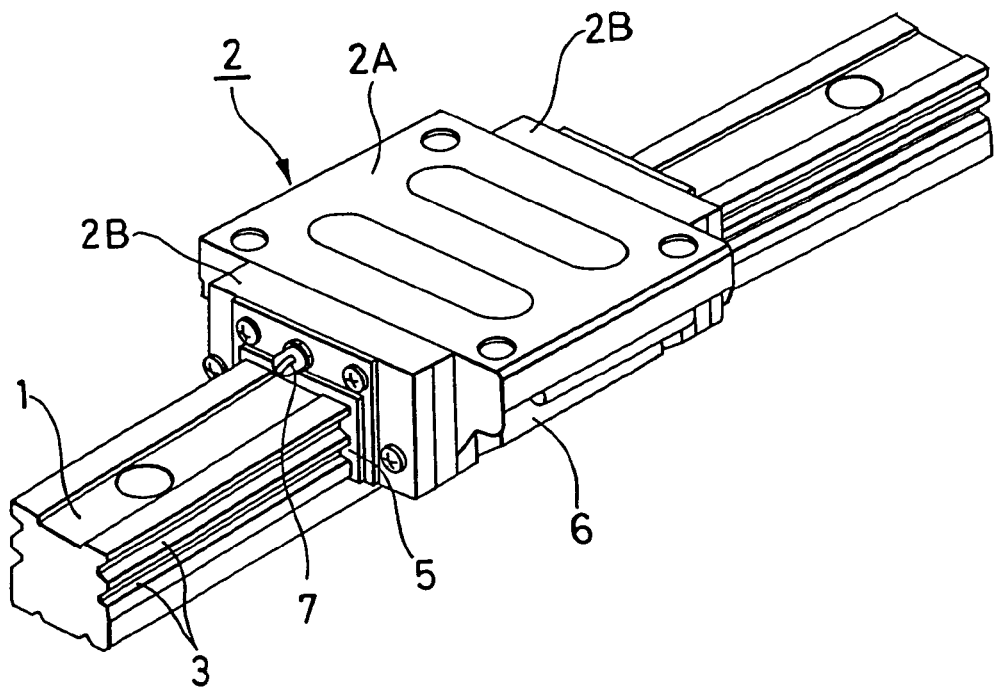
FIG. 37 is a perspective view of the conventional linear guide apparatus.
Figure 38:
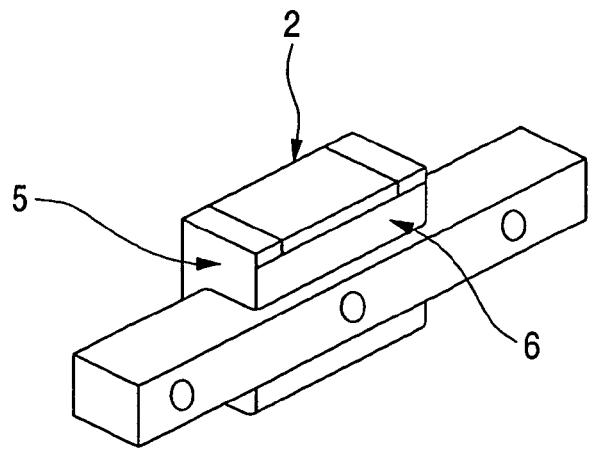
FIG. 38 is a perspective view of the lower surface side of the linear guide apparatus shown in FIG. 37.

In the linear guide apparatus of the first embodiment, the lubricant-containing polymer member 51 is fixed to the end face of the end cap 2B under the condition that the lubricant-containing polymer member 51 is interposed between the reinforcing plate 52 and the side seal 50. However, it should be noted that the present invention is not limited to the first embodiment. For example, in the same manner as that shown in FIG. 37, the side seal 50 is directly attached to the end face of the end cap 2B, and the lubricant-containing polymer member 51 may be fixed to the end face of the end cap 2B, to which the side seal 50 is attached, under the condition that the lubricant-containing polymer member 51 is interposed between two pieces of reinforcing plates 52. Even in the above arrangement, as long as the lubricant-containing polymer member 51 is arranged close to the lip portion of the side seal 50, the same effect as that of the first embodiment can be provided.

The present inventors made an experiment to check the abrasion of the side seal of the linear guide apparatus of the first embodiment. The result of the experiment will be explained below, referring to the comparative example.

First, the linear guide apparatus of the first embodiment of the present invention, the arrangements of which are described in Examples (1), (2) and (3), were manufactured. As a comparative example, the linear guide apparatus, the arrangement of which is described in Example (4), was manufactured.

EXAMPLE (1)

The side seal 50 was made of NBR rubber. The lubricant-containing polymer member 51 was manufactured as follows. That is, 70% by weight of paraffin mineral oil (FBK RO100 manufactured by Nippon Sekiyu Co.) to be used as lubricant was contained in polyethylene composed of 21% by weight of low molecular weight polyethylene (PZ50U manufactured by Mitsubishi Yuka Co.) and 9% by weight of super high molecular weight polyethylene (MIPELON XM220 manufactured by Mitsui Sekiyu Kagaku Co.). The thus obtained material was subjected to an injection molding machine and plasticized (melted). Then the plasticized material was injected into a predetermined metallic mold and cooled and solidified while it was being pressured. There was provided a gap of 0 to 0.1 mm between the inner face of the lubricant-containing polymer member 51 and the surface of the guide rail 1. A portion of the inner face of the lubricant-containing polymer member 51, the area of which was about 70% of the inner face, was contacted with the surface of the guide rail 1.

EXAMPLE (2)

An arrangement of Example (2) is the same as that of Example (1) except that the side seal 40 was made of grease-containing polyurethane rubber.

The grease-containing polyurethane rubber was manufactured as follows. Mixture (CORONATE T-6 manufactured by Nippon Polyurethane Kogyo Co.) to be used as polyisocyanate in which 2,4-tolylenediisocyanate and 2, 6-tolylenediisocyanate were mixed by a mixing ratio 65:35, was reacted with polyesterpolyol (NIPPOLLAN 4032 manufactured by Nippon Polyurethane Kogyo Co.) to be used as active hydrogen compound, so that compound was formed as a result of reaction. Polyisocyanate, active hydrogen compound and grease were mixed with each other so that the thus formed compound could be mixed with mineral oil lithium soap grease (Alvania Grease No. 2 manufactured by Showa Shell Sekiyu K.K.) to be used as grease, by a mixing ratio of 1:1. The thus obtained mixture was heated in an appropriate metallic mold and cured so that it was integrated into one body.

EXAMPLE (3)

The same side seal 50 and lubricant-containing polymer member 51 as those of Example (1) were used. However, the lubricant-containing polymer member 51 was not contacted with the guide rail 1, wherein a gap 0.2 mm to 0.3 mm was formed between the inner face of the lubricant-containing polymer member 51 and the outer surface of the guide rail 1. In this connection, concerning a linear guide apparatus in which the side seal 50 was directly attached to the end face of the end cap 2B and in which the lubricant-containing polymer member 51 interposed between two reinforcing plates 52 was fixed to the end face of the cap 2B to which the side seal 50 was attached, the following measurement was conducted under the same condition as that of Example (3). As a result of the measurement, the same result was obtained.

EXAMPLE (4)

The side seal 50 was made of NBR rubber, and the lubricant-containing polymer member 51 was not used.

The apparatus described in Examples (1) to (4) were operated in such a manner that the respective linear guide apparatus were made to run by 5000 km, and then quantities of abrasion were measured. By the measurement, the results shown on Table 1 were obtained. In this connection, although the side seals 50 were attached to both end portions of each linear guide apparatus, a quantity of abrasion of one side seal 50 was measured.

TABLE 1

| Linear Guide Apparatus | Quantity of Abrasion (g/piece) |
| --- | --- |
| Example (1) | 0.007 |
| Example (2) | 0.002 |
| Example (3) | 0.01 |
| Comparative Example (4) | 0.20 |

As can be seen in the result of the experiment, according to Examples (1), (2) and (3) of the present invention, a quantity of abrasion of the side seal 50 can be remarkably reduced, and the sealing property can be maintained over a long period of time.

Further, the present inventors made another experiment to check an endurance of the linear guide apparatus operating in an environment of being filled with wood cutting chips. In the endurance experiment, the linear guide apparatus of the first embodiment is filled up with Alvania Grease No. 2 mentioned above. The endurance experiment was carried out in the environment of the wood cutting chips piled up so that the linear guide apparatus was entirely covered with the wood cutting chips. The result of the endurance experiment will be explained below, referring to the comparative example.

TABLE 2

| Linear Guide Apparatus | Relative Running Life | Composition of lubricant-containing polymer member (% by weight) | Seal |
| --- | --- | --- | --- |
| Comparative Example (4) | 1.0 | none | NBR rubber |
| Example (1) | 2.5 | LPE: 21, HPE: 9, LUB: 70 | NBR rubber |
| Example (A) | 2.3 | LPE: 41, HPE: 9, LUB: 50 | NBR rubber |
| Example (B) | 1.7 | LPE: 61, HPE: 9, LUB: 30 | NBR rubber |
| Comparative Example (C) | 1.1 | LPE: 81, HPE: 9, LUB: 10 | NBR rubber |
| Comparative Example (D) | 0.9 | LPE: 21, HPE: 9, LUB: 70 | none |

In Table 2, Example (1) and Comparative Example (4) are the same as examples shown in Table 1. Examples (A) and (B) as well as Comparative Examples (C) and (D) were added for the endurance experiment. The relative running life was represented by a ratio that the running life of Comparative Example (4) was taken as 1.0. Comparative Example and (D) used a reinforcing plate with no seal. In the column of Table 2 regarding the composition of the lubricant-containing polymer member, "LPE" indicates low molecular weight polyethylene (PZ50U manufactured by Mitsubishi Yuka Co.); "HPE" indicates super high molecular weight polyethylene (MIPELON XM220 manufactured by Mitsui Sekiyu Kagaku Co.); and "LUB" indicates paraffin mineral oil (FBK RO100 manufactured by Nippon Sekiyu Co.) to be used as lubricant.

As can be seen in the result of the endurance experiment, when a quantity of lubricant is 50 to 80% by weight, the running life extends remarkably. In contrast, when a quantity of lubricant is less than 30% by weight, the effect of extending the running life is small. Particularly, when a quantity of lubricant is 10% by weight less than 20% by weight, the effect of extending the running life is not almost developed.

Further, if the NBR rubber is not attached in the outside of the lubricant-containing polymer member, the lubricant-containing polymer member has a manufacturing limit of about 0 to 0.1 mm as a gap relative to the guide rail. Accordingly, since the sealing property is deteriorated, the wood cutting chips are prone to enter to the interior of the linear guide apparatus, even compared with an example of only a rubber seal attached to the end cap. Therefore, the running life of the linear guide apparatus with no NBR rubber is made short.

Second Embodiment:

Next, the second embodiment of the present invention is shown in FIGS. 1 to 8B. A shape of the side seal of the apparatus of the second embodiment is different from the shape of the side seal of the apparatus of the first embodiment, which is a main different point. The side seal 12 of the second embodiment includes: a C-shaped steel plate, the shape of which is the same as the shape of the end cap 2B; and a piece of grease-containing polyurethane rubber, the shape of which is similar to the shape of the C-shaped steel plate, wherein the piece of grease-containing polyurethane rubber is integrally attached to an outer surface of the C-shaped steel plate.

There is provided a lip portion 13 of the side seal 12 which comes into contact with the guide rail 1. An inside face of the lip portion 13 of the side seal 12 coming into contact with the guide rail 1 is formed into a shape so that the side seal 12 can slidably come into contact with an upper face 1a and an outer side face 1b of the guide rail 1 and so that a gap between the slider 2 and the guide rail 1 can be sealed. More specifically, the lip portion 13 of the side seal 12 is formed into a shape so that the lip portion 13 can be slidably contacted with the rolling element rolling grooves 3A, 3B and the run-off groove 3a. In this connection, in both wing portions 12A, 12B of the side seal 12, there are formed through-holes 12a, 12b through which attaching screws penetrate. In a connecting portion 12C that connects both wing portions 12A and 12B, there is formed a through-hole 12c through which a grease nipple is attached.

There is provided a lubricant-containing member 11 which is interposed between the side seal 12 and the reinforcing plate 10. This lubricant-containing member 11 is formed into a substantial C-shape in accordance with the outer shape of the end cap 2B. The inside face of the C-shaped lubricant-containing member 11 is not tapered but flat. Accordingly, in the same manner as that of the inner face of the lip portion 13, the inside face of the C-shaped lubricant-containing member 11 can be contacted with an upper face 1a of the guide rail 1 and an outer side face 1b including the rolling element rolling grooves 3A, 3B in accordance with the sectional shape of the guide rail 1.

Figure 3A:
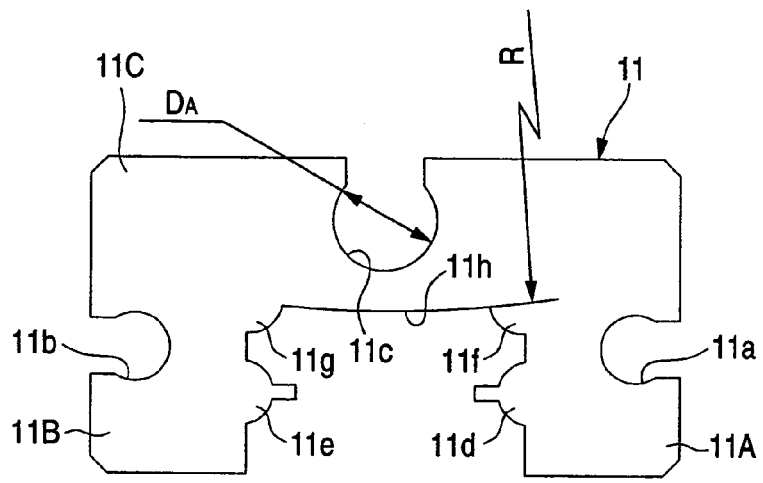
FIGS. 3A and 3B are views showing an arrangement of the lubricant-containing member of the second embodiment.
Figure 3B:
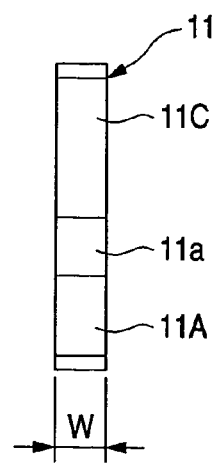

As shown in FIG. 3A which is a front view and FIG. 3B which is a side view of the lubricant-containing member 11, in both wing portions 11A and 11B of the lubricant-containing member 11, there are formed through-holes 11a, 11b through which the attaching screws penetrate. In a connecting portion 11C to connect both wing portions 11A and 11B, there is formed a through-hole 11c through which the grease nipple is attached. The through-holes 11a, 11b are respectively open to the outside of the wing portions 11A, 11B. The through-hole 11c is open to the upper face side of the connecting portion 11C.

Dimensions of the recessed portion of this lubricant-containing member 11 are determined so that the inner face of the recessed portion can be slidably contacted with the upper face 1a of the guide rail 1 and the outside face 1b including the rolling element rolling grooves 3A, 3B. In portions on the inner face of the recessed portion of the lubricant-containing member 11 opposed to the rolling element rolling grooves 3A, 3B and the run-off groove 3a of the guide rail 1, there are provided protrusions 11f, 11g, 11d and 11e which are formed so that they can slide on the inner faces of the grooves 3A, 3B and 3a. Further, The shape of an inner bottom face 11h of the lubricant-containing member 11, which slidably comes into contact with the upper face 1a of the guide rail 1, is formed into an arc, the radius of curvature of which is R, so that the center of the inner bottom face protrudes from both end portions close to the wing portions 11A, 11B when the lubricant-containing member 11 is not given a force from the outside.

Figure 4A:
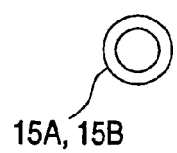
FIGS. 4A and 4B are views showing an arrangement of the ring-shaped member.
Figure 4B:
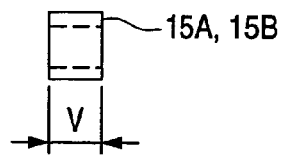

Ring-shaped members 15A, 15B are inserted into the respective through-holes 11a, 11b formed in both wing portions 11A, 11B of the lubricant-containing member 11. As shown in FIG. 4A which is a front view of the ring-shaped members 15A, 15B and also as shown in FIG. 4B which is a side view, the ring-shaped members 15A, 15B are short cylindrical members, and the outer diameters of the ring-shaped members 15A, 15B are appropriate to insert them into the through-holes 11a, 11b easily.

Figure 5A:
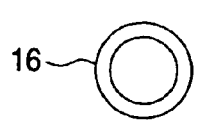
FIGS. 5A and 5B are views showing an arrangement of the ring-shaped member.
Figure 5B:
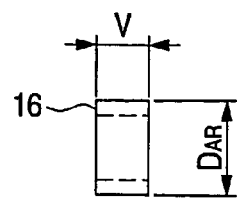

A ring-shaped member (or a solid cylindrical member) 16 is inserted into the through-hole 11c formed in the connecting section 11C of the lubricant-containing member 11. As shown in FIG. 5A which is a front view of the ring-shaped member 16 and also shown in FIG. 5B which is a side view, this ring-shaped member 16 is a short cylindrical member. However, the outer diameter $D_{AR}$ of the ring-shaped member 16 is larger than the inner diameter $D_A$ of the through-hole 11c. That is, when the ring-shaped member 16 is inserted into the through-hole 11c, the through-hole 11c is expanded.

Figure 6:
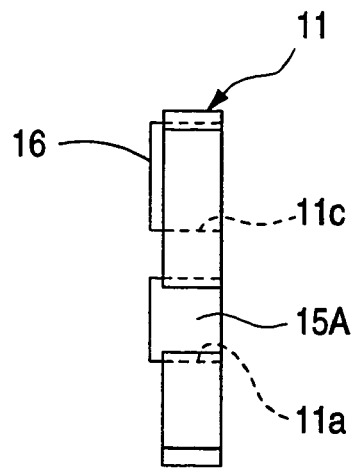
FIG. 6 is a side view of the lubricant-containing member in a condition that the ring-shaped member is attached.

Further, the length V of the ring-shaped members 15A, 15B is a little longer than the thickness W of the lubricant-containing member 11, for example, the length V of the ring-shaped members 15A, 15B is longer than the thickness W of the lubricant-containing member 11 by about 0.2 mm. That is, when the ring-shaped members 15A, 15B and 16 are respectively inserted into the through-holes 11a to 11c, as shown in FIG. 6, end portions of the ring-shaped members 15A, 15B and 16 protrude from the front side or the reverse side of the lubricant-containing member 11.

The reinforcing plate 10, the lubricant-containing member 11 and the side seal 12 are integrally fixed to the main body 2A together with the end cap 2B when the attaching screws 17A, 17B, which penetrate the through-holes 2a, 2b of the end cap 2B and screw to the main body 2A, penetrate the through-holes 12a, 12b of the side seal 12, the ring-shaped members 15A, 15B inside the through-holes 11a, 11b of the lubricant-containing member 11, and the through-holes 10a, 10b of the reinforcing plate 10.

Next, the mode of operation of the second embodiment will be explained below.

When the linear guide apparatus is driven, the lubricant-containing member 11 is moved coming into contact with the guide rail 1, and frictional heat is generated. Being influenced by the frictional heat, lubricant gradually oozes from the lubricant-containing member 11. After the lubricant has oozed out, it is automatically fed to the rolling elements, which are rolling in the rolling element rolling grooves 3A, 3B, via the rolling element rolling grooves 3A, 3B. Due to the self-lubricity described above, it is possible for the apparatus to be smoothly operated over a long period of time. Accordingly, even if lubricant is not fed to the slider 2 from the outside of the apparatus, operation can be smoothly continued over a long period of time under the condition of low resisting torque.

Figure 7:
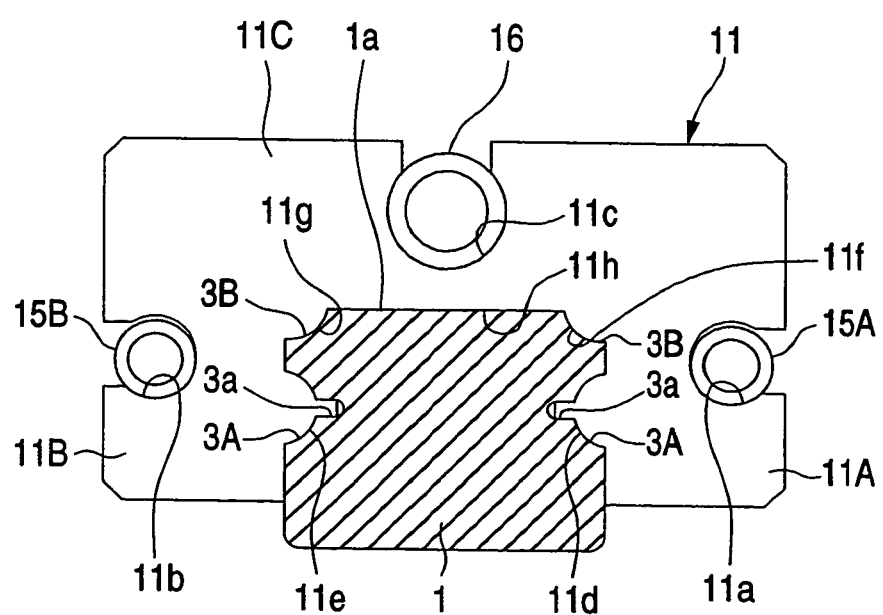
FIG. 7 is a front view of the lubricant-containing member which strides a guide rail.

As described above, the shape of the inner face of the recessed portion of the lubricant-containing member 11 is matched with the transverse cross-sectional shape of the guide rail 1. Therefore, as shown in FIG. 7, the lubricant-containing member 11 can be closely contacted with the upper face 1a and the side face 1b of the guide rail 1. As the lubricant oozes from the lubricant-containing member 11, the lubricant-containing polymer member 11 shrinks by itself. By the shrinking force, the lubricant-containing polymer member 11 closely comes into contact with the surface of the guide rail 1 to be sealed at all times. Therefore, the lubricant-containing member 11 performs both the sealing function and the lubricating function.

In the second embodiment, since the side seal 12 is used as a plate member on the outside of the lubricant-containing member 11, the sealing property can be more enhanced.

Figure 8A:
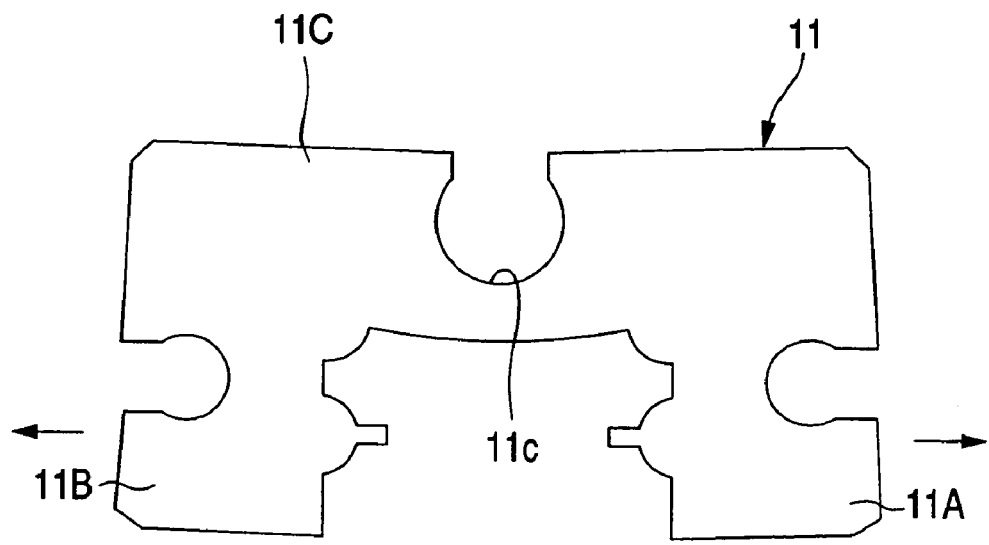
FIGS. 8A and 8B are schematic illustrations showing the mode of operation.

Especially, in the second embodiment, since an upper face side of the through-hole 11c formed in the connecting section 11C of the lubricant-containing member 11 is cut away, the upper face side of the through-hole 11c is open. Accordingly, as shown in FIG. 8A, the wing portions 11A and 11B can be easily expanded in the transverse direction. Therefore, the lubricant-containing member 11 can be easily attached in the assembling process even if it is arranged striding the guide rail 1.

Figure 8B:
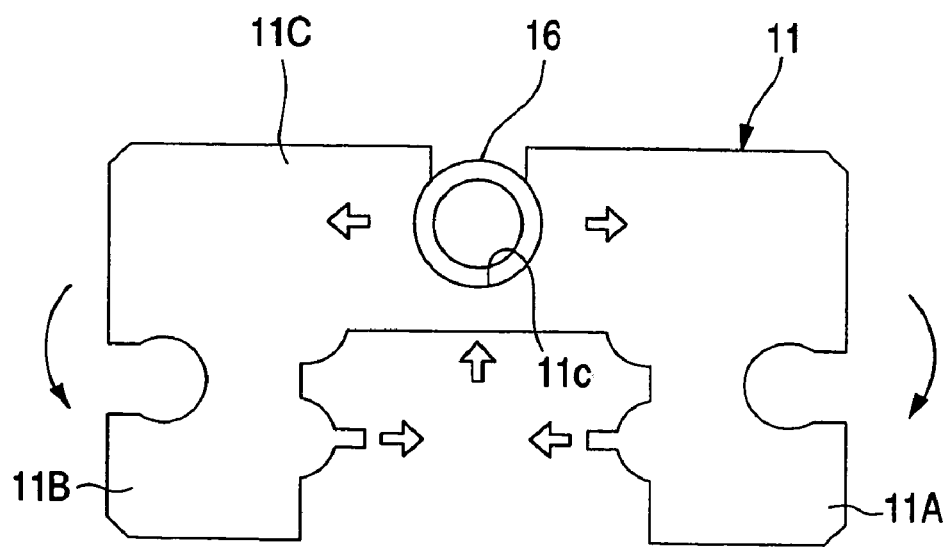

Into the through-hole 11c of the lubricant-containing member 11, the ring-shaped member 16, the outer diameter of which is larger than the inner diameter of the through-hole 11c, is inserted to be used as a pushing means. Accordingly, when the lubricant-containing member 11 strides the guide rail 1 as shown in FIG. 8B, the ring-shaped member 16 expands the through-hole 11c in the transverse direction. Therefore, a pushing force to push the wing portions 11A, 11B against the guide rail 1 is generated by this pushing means. Due to the foregoing, even if some manufacturing errors are caused in the size of the lubricant-containing member 11, or even if the lubricant-containing member 11 wears away a little, it is possible to make the lubricant-containing member 11 closely come into contact with the surface of the guide rail 1 to be sealed at all times. In this case, due to the structure of the through-hole 11c, the upper face side of which is open, a force to expand the through-hole 11c by the ring-shaped member 16 is effectively converted into a pushing force to push the wing portions 11A, 11B against the guide rail 1. Therefore, this structure of the through-hole 11c is very advantageous.

The length V of the ring-shaped members 15A, 15B is a little longer than the thickness W of the lubricant-containing member 11. Therefore, end portions of the ring-shaped members 15A, 15b and 16 are protruded from the front side or the reverse side of the lubricant-containing member 11. Since the attaching means for attaching the lubricant-containing member 11 is composed in the above manner, although the lubricant-containing member 11 is interposed between the reinforcing plate 10 and the side seal 12, the friction can be reduced. Due to the foregoing arrangement, the lubricant-containing member 11 is smoothly deformed by the self-shrinkage and the aforementioned pushing force in a direction perpendicular to the axial direction of the guide rail 1. Accordingly, it is possible to make the lubricant-containing member 11 closely come into contact with the guide rail 1 at all times.

As described above, the inner bottom surface 11h of the recessed portion of the lubricant-containing member 11 is formed into an arc. Therefore, when the wing portions 11A, 11B of the lubricant-containing member 11 are deformed being pushed against the guide rail 1 by the self-shrinkage or the pushing force, the inner bottom surface 11h is put into a substantially horizontal condition, and the inner bottom surface 11h stably comes into contact with the upper face 1a of the guide rail 1.

Since the lubricant-containing member 11 is interposed between the reinforcing plate 10 and the side seal 12, it is easy to increase the size of the lubricant-containing member 11 so that a sufficient quantity of lubricant can be contained in the member to continue a smooth rolling motion of the rolling elements over a long period of time. Further, since the lubricant-containing member 11 is not made to adhere onto a steel plate or other members, it is possible to reduce the cost of the lubricant-containing member 11 which is an article of consumption. Furthermore, it is possible to save time and labor when the lubricant-containing member 11 is replaced.

Since the lubricant-containing member 11 is interposed between the reinforcing plate 10 and the side seal 12, it is difficult for the lip portion 13, which is a portion of the side seal 12 to be contacted with the guide rail 1, to get rolled up when the slider 2 is reciprocated. Accordingly, the leakage of grease from the slider 2 can be reduced.

After the lubricant has oozed from the lubricant-containing member 11, it is fed to the lip portion 13 of the side seal 12 which comes into contact with the guide rail 1. Therefore, the lubricant that has oozed from the lubricant-containing member 11 is useful for the reduction of abrasion of the lip portion 13. Especially, in the second embodiment, the lip portion 13 is made of polyurethane rubber that has been cured under the condition that grease is contained in it. Accordingly, the lubricant is fed by the lip portion 13 itself, and the abrasion of the lip portion 13 can be more reduced. Since the abrasion of the lip portion 13 can be minimized, the sealing property of the lip portion 13 can be maintained over a long period of time, and further it is possible to prevent the intrusion of foreign objects into the main body 2A. Accordingly, the life of the linear guide apparatus can be prolonged.

According to the arrangement of the second embodiment, lubricant is fed from the lubricant-containing member 11 to the rolling elements at all times. Therefore, the grease nipple attaching hole may be closed with a blank plug, however, this grease nipple attaching hole may be opened when necessary so as to feed lubricant into the slider.

In the second embodiment, the side seal 12 corresponds to the plate member, the reinforcing plate 10 corresponds to another plate member, and the ring-shaped member 16 corresponds to the pushing means.

Figure 9:
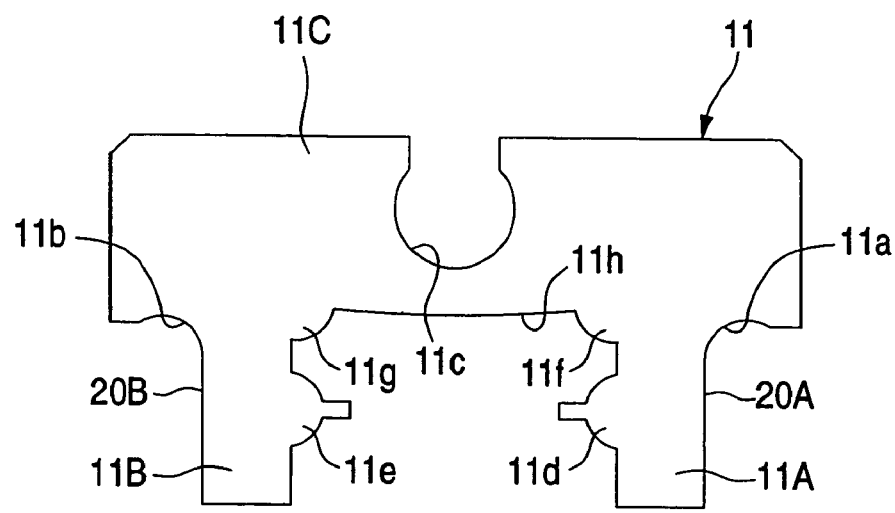
FIG. 9 is a front view showing an arrangement of the lubricant-containing member of a third embodiment of the present invention.
Figure 10:
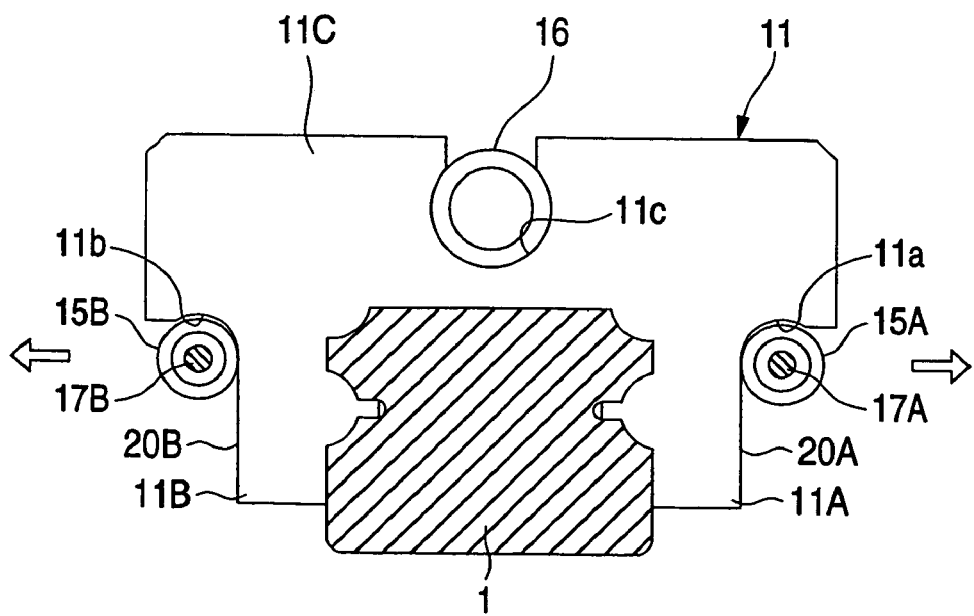
FIG. 10 is a schematic illustration showing the mode of operation of the third embodiment.

Third Embodiment:

FIGS. 9 and 10 are views showing the third embodiment of the present invention. In this connection, like reference characters are used to indicate like parts in the views showing the second embodiment and the third one, and the overlapping explanations are omitted here.

The arrangement of the linear guide apparatus of the third embodiment is the same as that of the first embodiment described above, except that the shape of the lubricant-containing member 11 is changed.

Specifically, as shown in FIG. 9 which is a front view of the lubricant-containing member 11, the shape of the lubricant-containing member 11 is composed as follows. In the wing portions 11A, 11B, there are formed cutout portions 20A, 20B which continue to the through-holes 11a, 11b through which the attaching screws penetrate, and the outside and the front end side of the wing portions 11A, 11B are opened by the cutout portions 20A, 20B, and the inner diameters of the ring-shaped members 15A, 15B, which are inserted into the through-holes 11a, 11b, are made to be larger than the outer diameters of the attaching screws 17A, 17B. Other arrangements are the same as those of the second embodiment.

According to the above arrangement, as shown in FIG. 10 which is a front view of the lubricant-containing member 11 arranged in a condition of striding the guide rail 1, when the attaching screws 17A, 17B are loosened, the ring-shaped members 15A, 15B can be moved outside. Therefore, only the lubricant-containing member 11 can be removed from the linear guide apparatus being pulled upward. In this way, the lubricant-containing member 11 can be removed from the linear guide apparatus. A new lubricant-containing member 11 can be inserted into the linear guide apparatus from the upside without removing the side seals and others from the main body 2A. The lubricant-containing member 11 can be incorporated to the main body in such a manner that the ring-shaped members 15A, 15B are pushed into the through-holes 11a, 11b, and then the attaching screws 17A, 17B are fastened.

According to the arrangement of the third embodiment of the present invention, the lubricant-containing member 11 from which the lubricant has completely oozed can be easily replaced with a new lubricant-containing member 11, which is called a cassette system. Therefore, it is possible to feed the lubricant without requiring much time and labor while the operator's hands are maintained clean.

Other point of the third embodiment are the same as those of the first embodiment described before.

Fourth Embodiment:

FIGS. 11 to 17 are views showing the fourth embodiment of the present invention. In this connection, like reference characters are used to indicate like parts in the views showing the first to third embodiments described before, and the overlapping explanations are omitted here.

In the fourth embodiment, an arrangement to generate a pushing force to push the wing portions 11A, 11B of the lubricant-containing member 11 against the guide rail 1 is different from that of the first and second embodiments described before.

Figure 11:
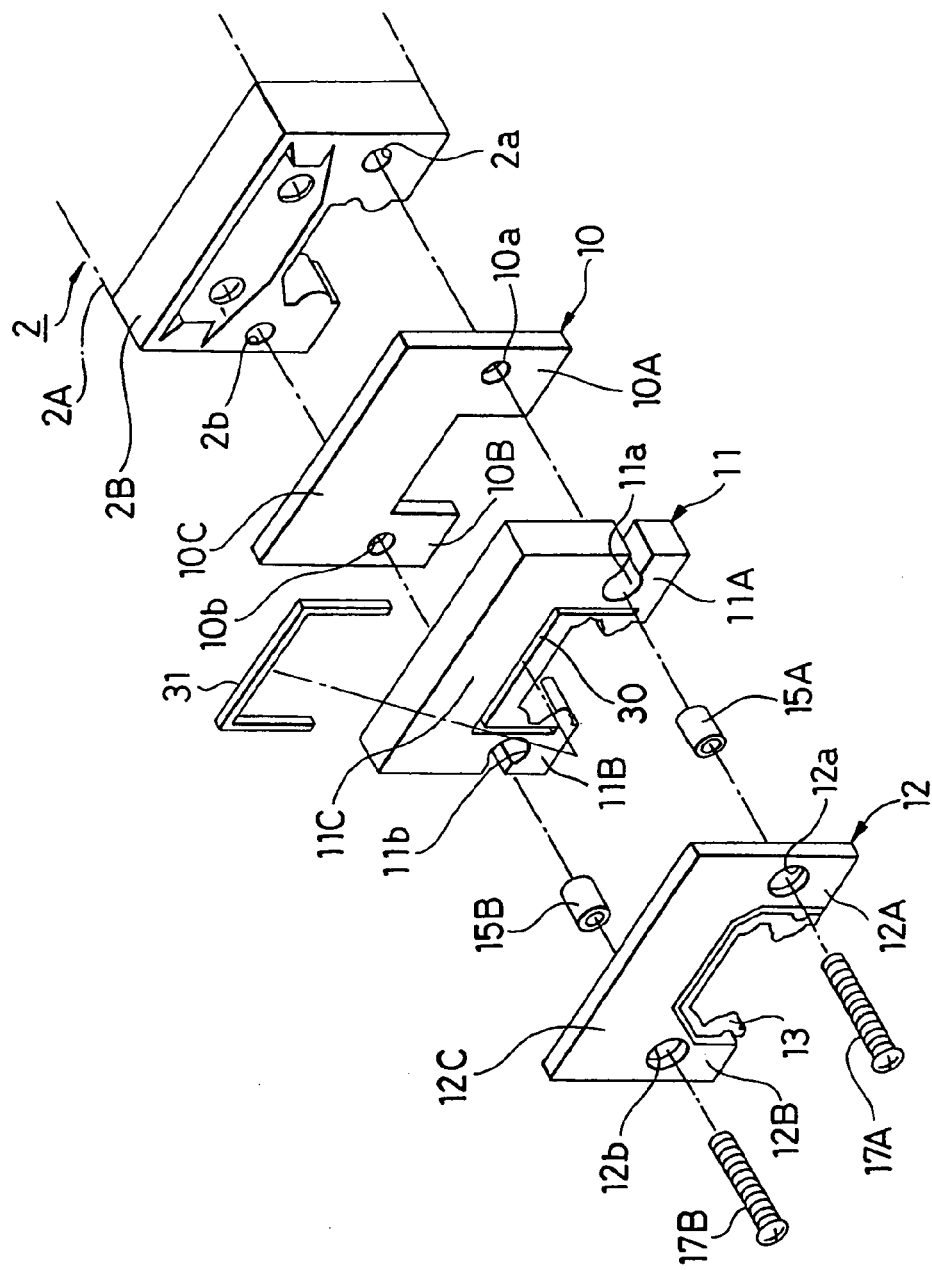
FIG. 11 is a perspective view showing an attaching condition of each member of a sealing device of a fourth embodiment.
Figure 12A:
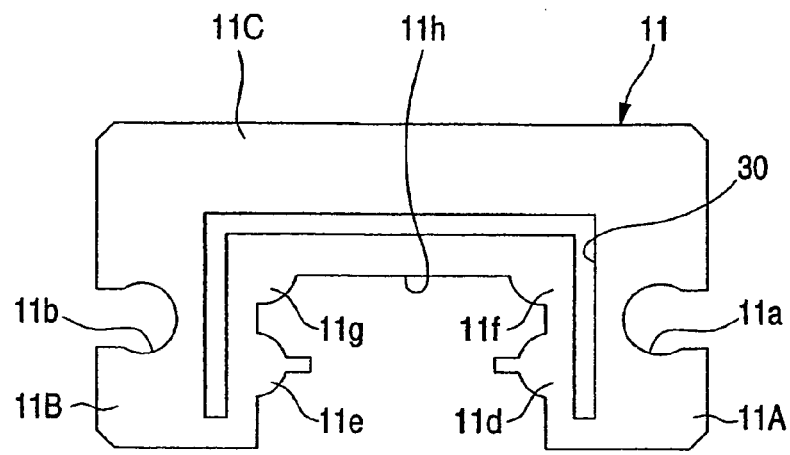
FIGS. 12A and 12B are views showing an arrangement of the lubricant-containing member of the fourth embodiment.
Figure 12B:
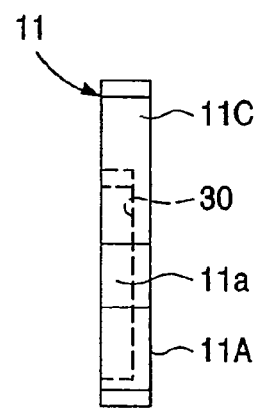
Figure 13A:
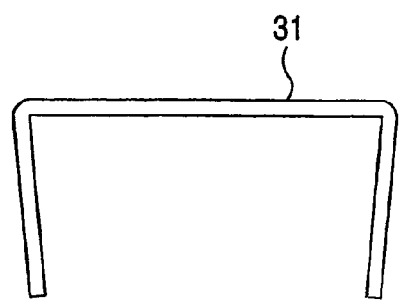
FIGS. 13A and 13B are views showing an arrangement of the elastic body of the fourth embodiment.
Figure 13B:

The specific arrangement is shown in FIGS. 11, 12A and 12B. FIG. 11 is a perspective view showing an assembling condition of the end portion of the slider 2, FIG. 12A is a front view of the lubricant-containing member 11, and FIG. 12B is a side view of the lubricant-containing member 11. As shown in these drawings, the lubricant-containing member 11 is composed as follows. The through-hole 11c of the lubricant-containing member 11 is omitted. On the surface of the lubricant-containing member 11 on the front side of the side seal 12, there is formed a continuous C-shaped groove 30 which surrounds the recessed portion of the lubricant-containing member 11. In the groove 30, there is provided an elastic body 31 which acts as the pushing means shown in FIG. 13A which is a front view, and FIG. 13B which is a bottom view.

The elastic body 31 is an elastically deformable member made of steel, synthetic resin or hard rubber. The shape of the elastic body 31 is a substantial C-shape in accordance with the shape of the groove 30. Under the condition that the elastic body 31 is not given a force from the outside, the width of the opening side of the C-shape is a little reduced.

Other points of the fourth embodiment are the same as those of the first and second embodiments described before. However, according to the fourth embodiment, the through-hole 11c of the lubricant-containing member 11 is omitted, and the through-hole 10c of the reinforcing plate 10 and the through-hole 12c of the side seal 12 are also omitted, so that the grease nipple is not provided. However, like the second embodiment described before, the through-holes 10c, 11c, 12c may be formed, and the grease nipple attaching hole is closed with a blank plug in a normal operating condition and opened when necessary so as to feed lubricant such as grease into the slider.

Figure 14:
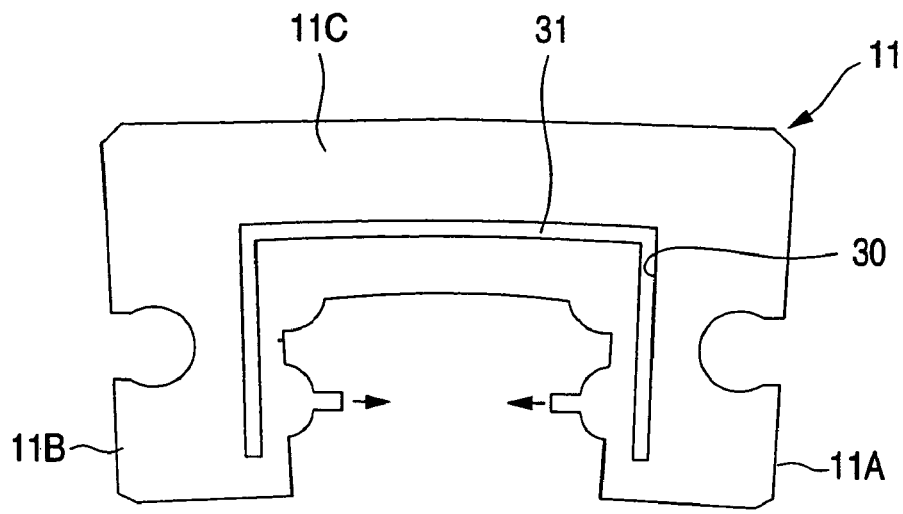
FIG. 14 is a schematic illustration of the mode of operation of the fourth embodiment.
Figure 15:
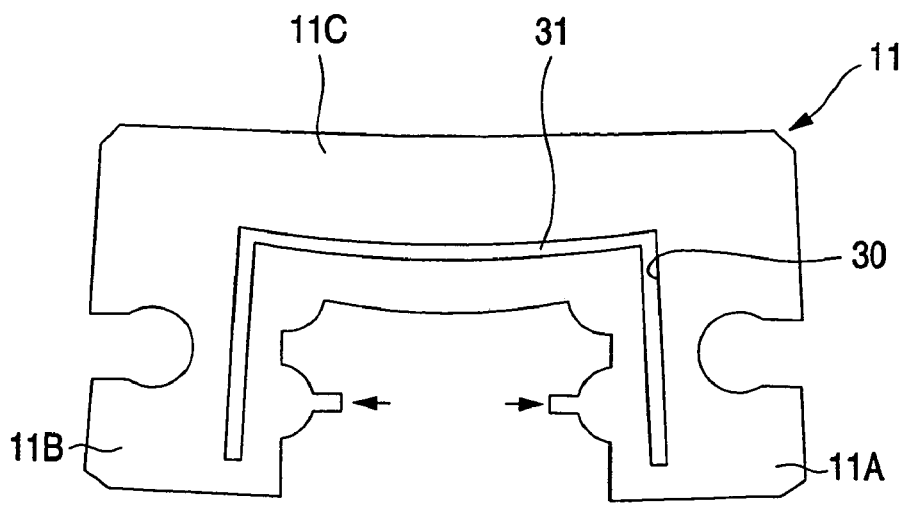
FIG. 15 is a schematic illustration of the mode of operation of the fourth embodiment.
Figure 16:
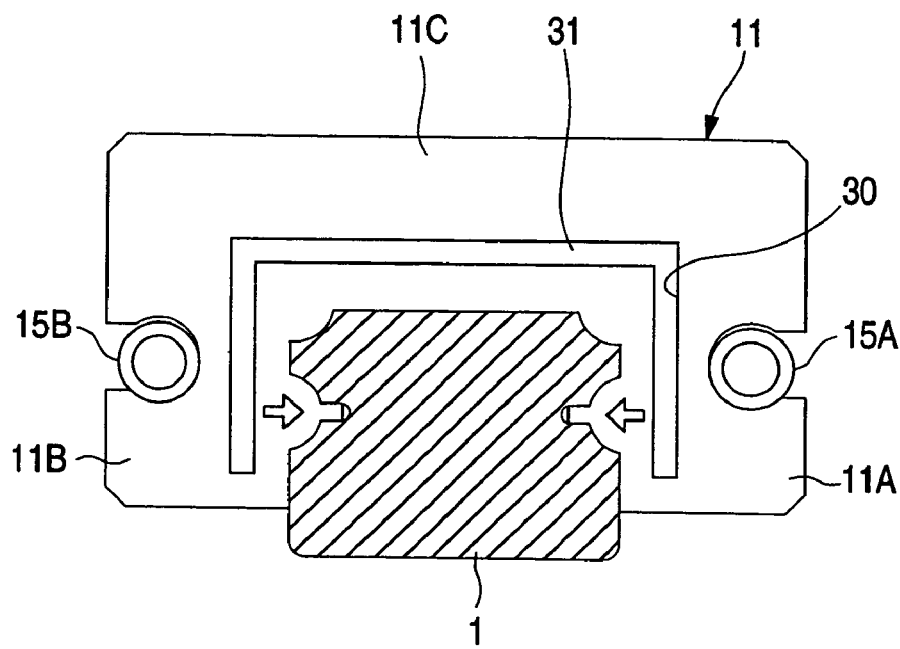
FIG. 16 is a front view of the lubricant-containing member of the fourth embodiment, wherein the view shows a condition in which the member strides the guide rail.
Figure 17:
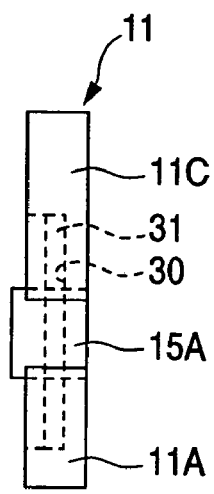
FIG. 17 is a side view of the lubricant-containing member of the fourth embodiment, wherein a ring-shaped member is attached to the member.

According to the arrangement of the fourth embodiment, as shown in FIG. 14, a pushing force to push the wing portions 11A, 11B of the lubricant-containing member 11 against the guide rail 1 is generated by an elastic force of the elastic body 31 provided in the groove 30, and as shown in FIG. 15, when the lubricant-containing member 11 is attached to the apparatus, the wing portions 11A, 11B can be expanded in the transverse direction. Accordingly, as shown in FIG. 16, it is possible to make the lubricant-containing member 11 closely come into contact with the guide rail 1 in a stable condition. Since the shape of the elastic body 31 is determined in such a manner that an interval of the front end portions is reduced when no load is given, even if the lubricant-containing member 11 wears away a little, the inner surfaces of the wing portions 11A, 11B can be more positively pressed against the guide rail 1. As shown in FIG. 17, since the ring-shaped members 15A, 15B protrude from the surface of the lubricant-containing member 11 in the same manner as that of the first embodiment described before, the lubricant-containing member 11 can be smoothly deformed.

In the above explanations, it can be seen that the same effect as that of the first and second embodiments is provided by the fourth embodiment.

Since the elastic body 31 to generate a pushing force is arranged in such a manner that it surrounds the recess of the lubricant-containing member 11 and the end portions of the elastic body 31 are extended to positions close to the front end portions of the wing portions 11A, 11B, the pushing force generated by the elastic body can be more positively transmitted to the wing portions 11A, 11B.

Figure 18A:
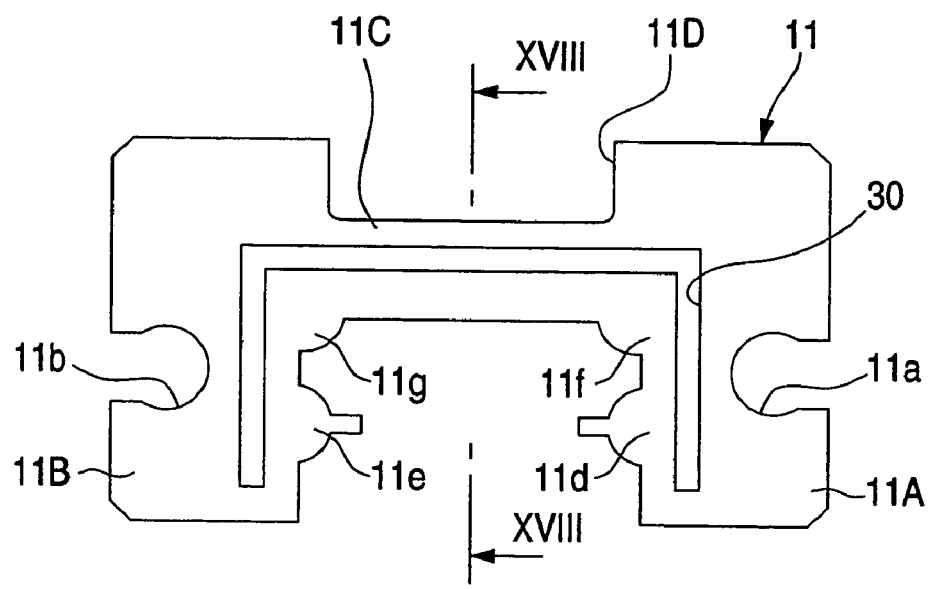
FIGS. 18A and 18B are views showing an arrangement of the lubricant-containing member of a fifth embodiment of the present invention.
Figure 18B:
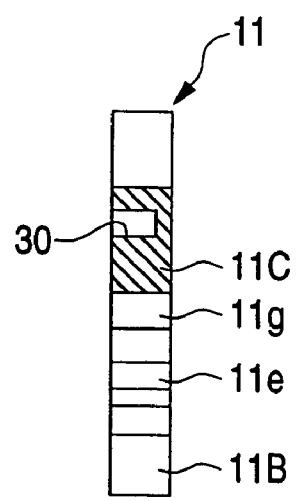

Fifth Embodiment:

FIGS. 18A and 18B are views showing the fifth embodiment of the present invention. FIG. 18A is a front view of the lubricant-containing member 11. FIG. 18B is a cross-sectional view taken on line XVIII—XVIII in FIG. 18A.

An arrangement of the fifth embodiment is essentially the same as that of the fourth embodiment described above. A different point is that a substantially rectangular cutout portion 11D, which is open upward, is formed on an upper surface of the connecting section 11C of the lubricant-containing member 11.

When the above cutout portion 11D is formed, the rigidity of the connecting section 11C is lowered. Therefore, an elastic force generated by the elastic body 31 is effectively converted into a pushing force by which the wing portions 11A, 11B can be pressed against the guide rail 1. Accordingly, it becomes possible to make the lubricant-containing member 11 more positively come into contact with the guide rail 1. Other points are the same as those of the fourth embodiment described before.

Sixth Embodiment:

FIGS. 19A to 22 are views showing the sixth embodiment of the present invention. In this connection, like reference characters are used to indicate like parts, and the overlapping explanations are omitted here.

Figure 19A:
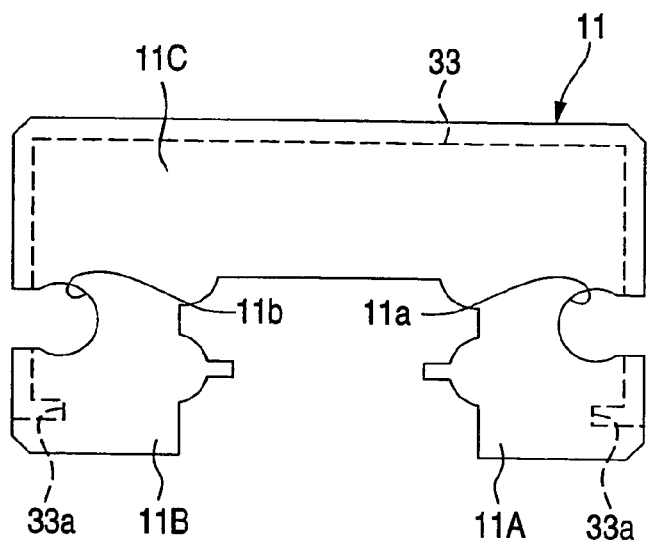
FIGS. 19A and 19B are views showing an arrangement of the lubricant-containing member of a sixth embodiment of the present invention.
Figure 19B:
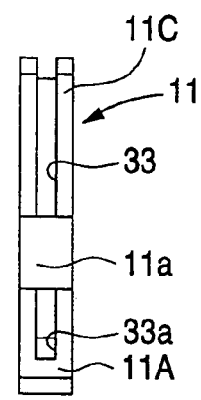

In the sixth embodiment, as shown in FIG. 19A which is a front view of the lubricant-containing member 11 and FIG. 19B which is a side view, there is formed a continuous outer circumferential groove 33 on the outer surfaces of the wing portions 11A, 11B and also on the upper surface of the connecting section 11C. In this connection, at both ends of the outer circumferential groove 33, there are formed recesses 33a which enter the inside of both wing portions 11A, 11B.

Figure 20:
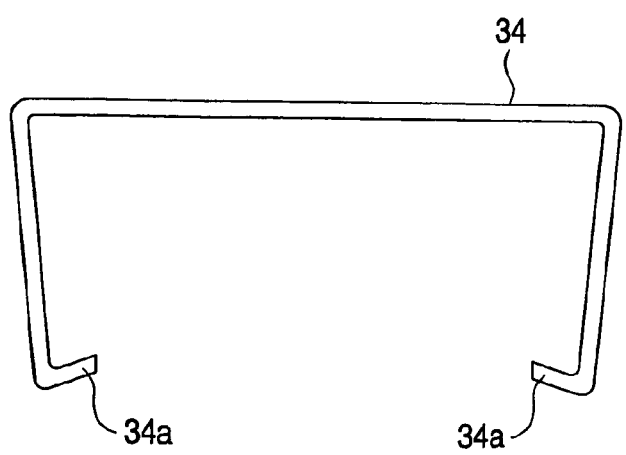
FIG. 20 is a view showing an arrangement of the elastic body of the sixth embodiment.

An elastic body 34 shown in FIG. 20, which acts as the pushing means, is engaged with the outer circumferential groove 33. An arrangement of the elastic body 34 is the same as that of the elastic body 31 shown in the fourth embodiment, except that the size of the elastic body 34 is increased and protrusions 34a to be engaged with the recesses 33a are formed at the front end portions.

Figure 21A:
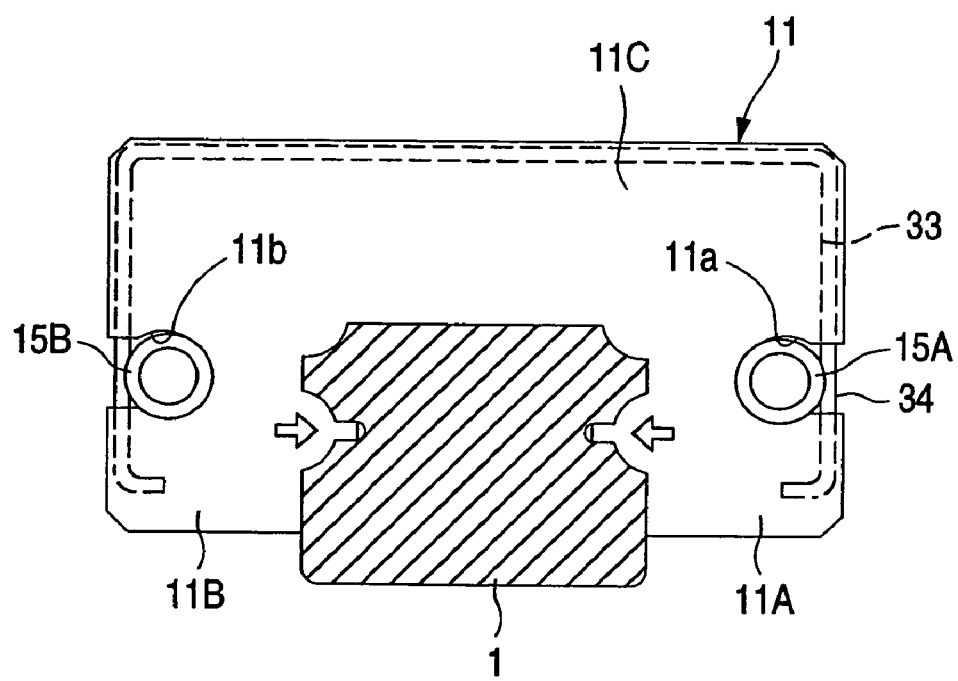
FIGS. 21A and 21B are schematic illustrations showing an assembling condition of the sixth embodiment.
Figure 21B:
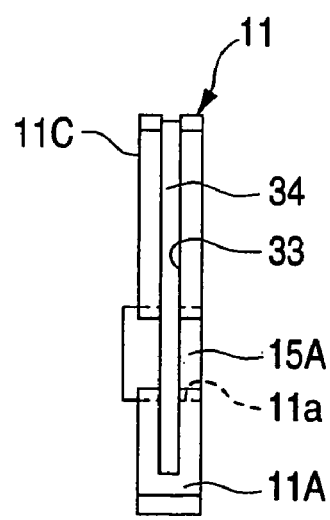

In the above arrangement, as shown in FIG. 21A, the elastic body 34 pushes the wing portions 11A, 11B to the guide rail 1. Therefore, the lubricant-containing member 11 can be made to stably come into close contact with the guide rail 1. Since the ring-shaped members 15A, 15B protrude from the surface of the lubricant-containing member 11 as shown in FIG. 21B in the same manner as that of the above second embodiment, the lubricant-containing member 11 can be smoothly deformed. Accordingly, the same effect as that of the fourth embodiment can be provided by the sixth embodiment.

Figure 22:
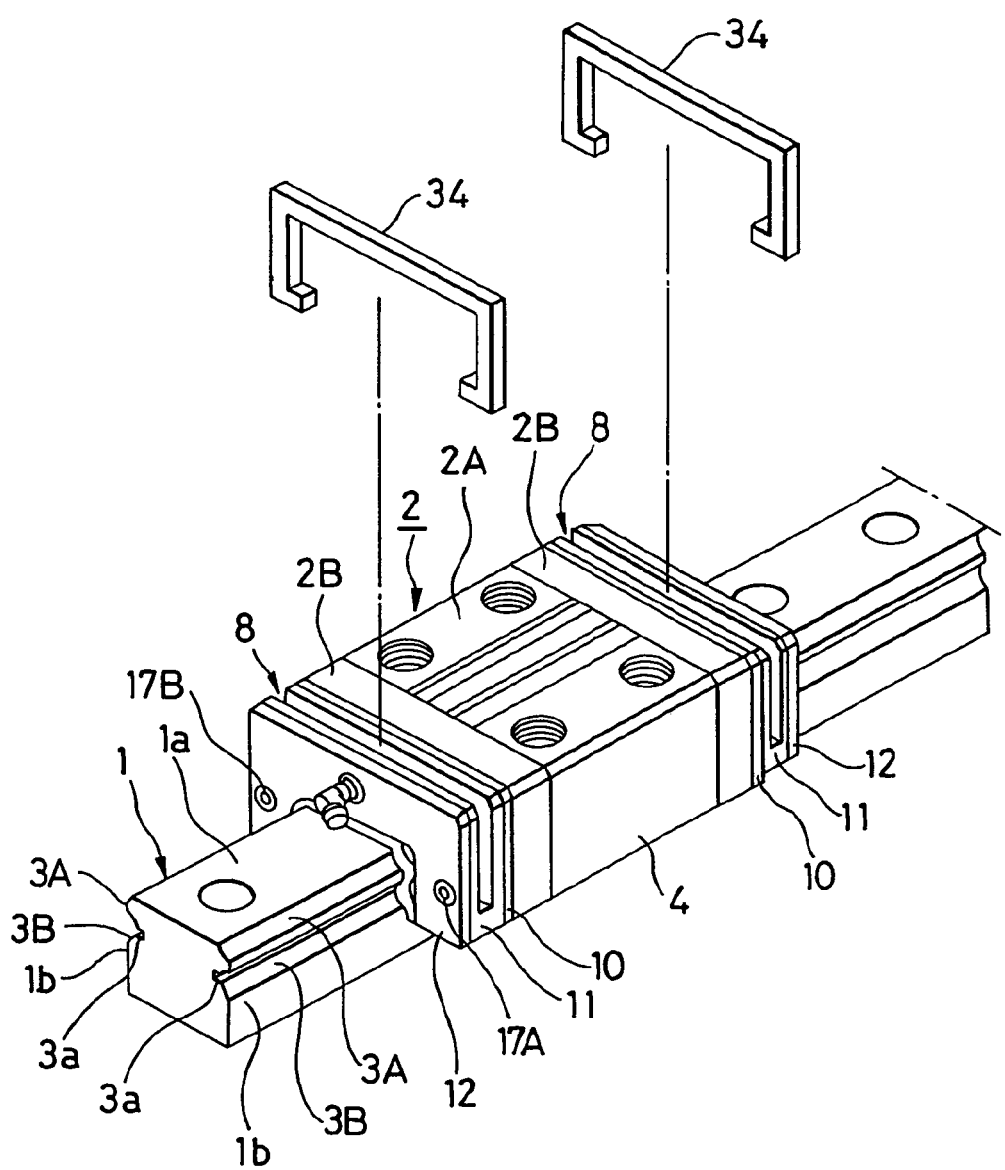
FIG. 22 is a perspective view of the linear guide apparatus of the sixth embodiment.

According to the arrangement of the sealing device 8 of the sixth embodiment as shown in FIG. 22, only the elastic body 34 can be removed without loosening or removing the attaching screws 17A, 17B. For this reason, it is possible to attach the elastic body 34 after all the parts have been attached. Therefore, this arrangement can be variously used. For example, when it is unnecessary to press the lubricant-containing member 11 against the guide rail 1, the elastic body 34 is removed, and only when it becomes necessary to press the lubricant-containing member 11 against the guide rail 1, the elastic body 34 is attached. Alternatively, when it is required that an intensity of the pushing force of the lubricant-containing member 11 against the guide rail 1 is changed, the elastic body 34 is replaced with another one.

For example, this arrangement can be used as follows. Immediately after the use of a new lubricant-containing member 11 is started, the lubricant-containing member 11 seldom wears away, so that the lubricant-containing member 11 can be made to closely come into contact with the guide rail 1. In this case, when the elastic body 34 is attached to the lubricant-containing member 11, too much lubricant oozes from the lubricant-containing member 11. Therefore, the elastic body 34 is previously removed. When the lubricant-containing member 11 wears away and it becomes difficult to make the lubricant-containing member 11 closely come into contact with the guide rail 1, the elastic body 34 is attached so as to make the lubricant-containing member 11 closely come into contact with the guide rail 1. In the event of progress of abrasion, the elastic body 34 is replaced with a more elastic body. In this way, a quantity of oozing lubricant can be stably maintained at an appropriate value at all times.

In the sixth embodiment, there are formed recesses 33a at both ends of the outer circumferential groove 33, and also there are formed protrusions 34a engaging with these recesses 33a at both ends of the elastic body 34. Accordingly, even if the elastic body 34 is set from the outside, there is no possibility that the elastic body 34 easily falls off or slips in a direction in which the elastic body 34 is disconnected from the apparatus.

Figure 23:
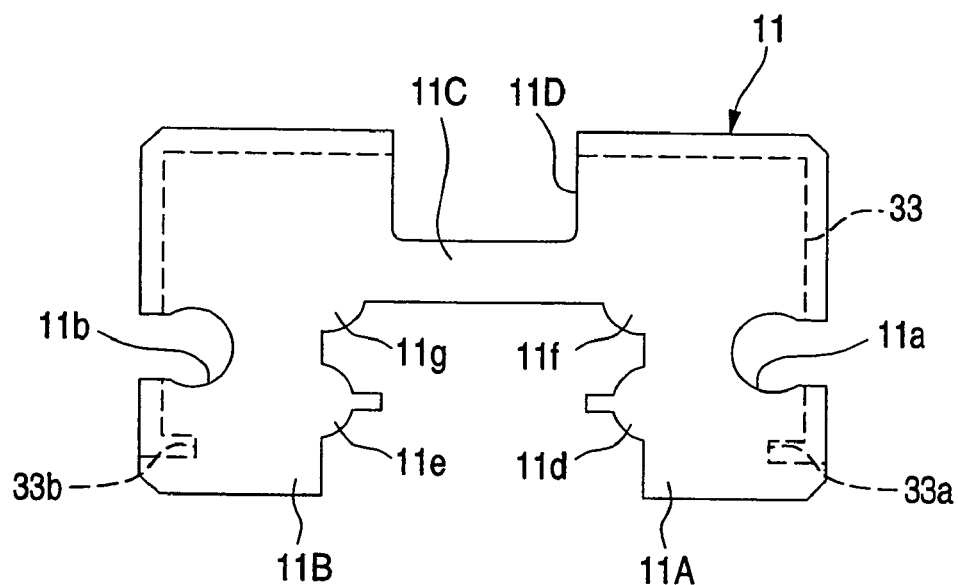
FIG. 23 is a front view of the lubricant-containing member of a seventh embodiment of the present invention.

Seventh Embodiment:

FIG. 23 is a view showing the seventh embodiment of the present invention. FIG. 23 is a front view of the lubricant-containing member 11.

An arrangement of the seventh embodiment is essentially the same as that of the fourth embodiment described before. A different point is that a substantially rectangular cutout portion 11D, which is open upward, is formed on an upper surface of the connecting section 11C of the lubricant-containing member 11. Due to the foregoing, the same effect as that of the fifth embodiment can be provided by this embodiment, and other effects are the same as those of the sixth embodiment.

Eighth Embodiment:

FIGS. 24 to 26B are views showing the eighth embodiment of the present invention. In this connection, like reference characters are used to indicate like parts in the views showing each embodiment described before, and the overlapping explanations are omitted here.

Figure 24:
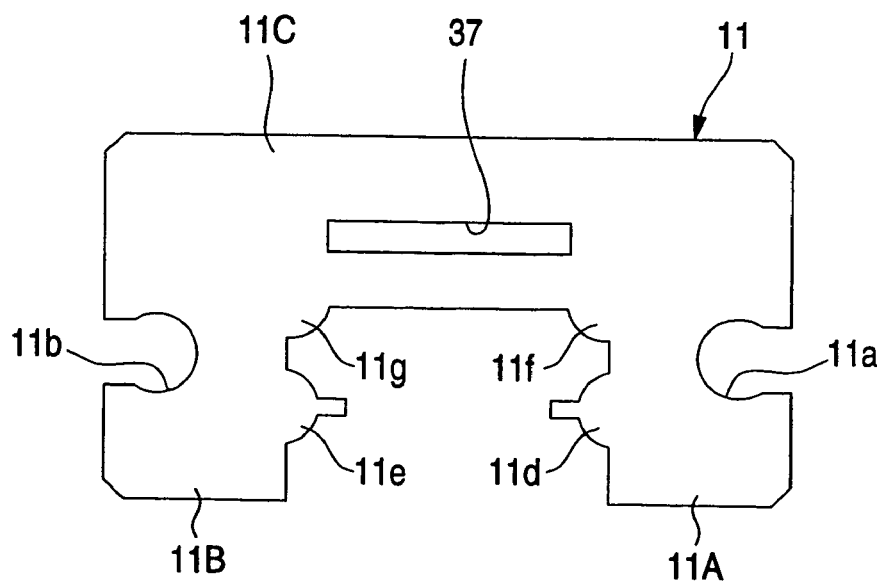
FIG. 24 is a view of the lubricant-containing member of an eighth embodiment of the present invention.

In the eighth embodiment, as shown in FIG. 24 which is a front view of the lubricant-containing member 11, in the connecting section 11c of the lubricant-containing member 11, there is formed a linear groove 37 extending in the width direction of the lubricant-containing member 11. Into this groove 37, an elastic body 38 is set which acts as the pushing means shown in FIG. 25A which is a front view and FIG. 25B which is a bottom view.

The elastic body 38 is a thin prism-shaped elastic member made of steel, synthetic resin or hard rubber, which is a little curved. As shown in FIG. 26A which is a front view and FIG. 26B which is a side view, the elastic body 38 is set into the groove 37 while the elastic body 38 is curved in a direction reverse to its curved shape.

Even in this arrangement, the connecting section 11C of the lubricant-containing member 11 is curved inside by an elastic restoring force of the elastic body 38. Therefore, a pushing force to push the wing portions 11A, 11B against the guide rail 1 is generated. Accordingly, the same effect as that of the second embodiment described before can be provided by the eighth embodiment.

Ninth Embodiment:

FIGS. 27 to 29B are views showing the ninth embodiment of the present invention. In this connection, like reference characters are used to indicate like parts in the views showing the embodiments described before, and the overlapping explanations are omitted here.

Figure 27:
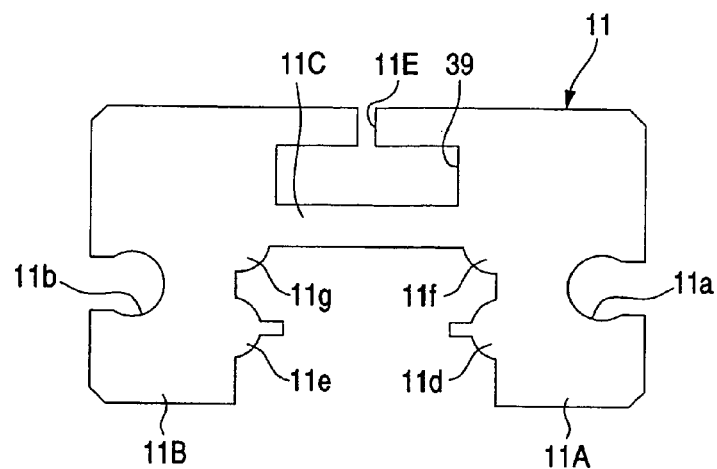
FIG. 27 is a front view of the lubricant-containing member of a ninth embodiment of the present invention.

In the ninth embodiment, as shown in FIG. 27 which is a front view of the lubricant-containing member 11, in the connecting section 11c of the lubricant-containing member 11, there is formed a rectangular through-hole 39 which is long in the transverse direction. In this connection, on the upper side of the lubricant-containing member 11, there is formed a cutout portion 11E through which the through-hole 39 communicates with the outside.

Figure 28A:
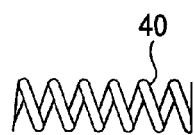
FIGS. 28A and 28B are views showing an arrangement of the elastic body of the ninth embodiment.
Figure 28B:
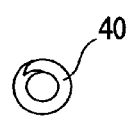
Figure 29A:
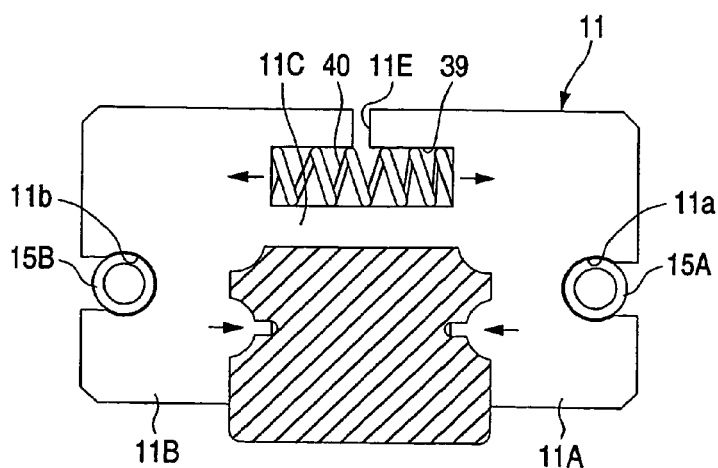
FIGS. 29A and 29B are schematic illustrations showing an assembling condition of the ninth embodiment.
Figure 29B:
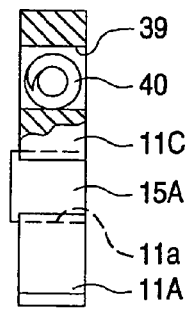

As shown in FIG. 28A which is a front view and FIG. 28B which is a side view, a coil spring 40, which acts as the pushing means, is accommodated in the through-hole 39 under the condition that its expanding direction is aligned in the transverse direction and it is compressed as shown in FIG. 29A which is a front view and FIG. 29B which is a partially cutaway side view.

According to this arrangement, the rigidity of the connecting section 11C in the transverse direction is reduced by the action of the cutout 11E, and the connecting section 11C of the lubricant-containing member 11 is expanded in the transverse direction by an elastic restoring force of the coil spring 40. As a result, a pushing force to push the wing portions 11A, 11B to the guide rail 1 is generated. Therefore, the same effect as that of the second embodiment described before can be provided by the ninth embodiment.

Figures 30A, 30B:
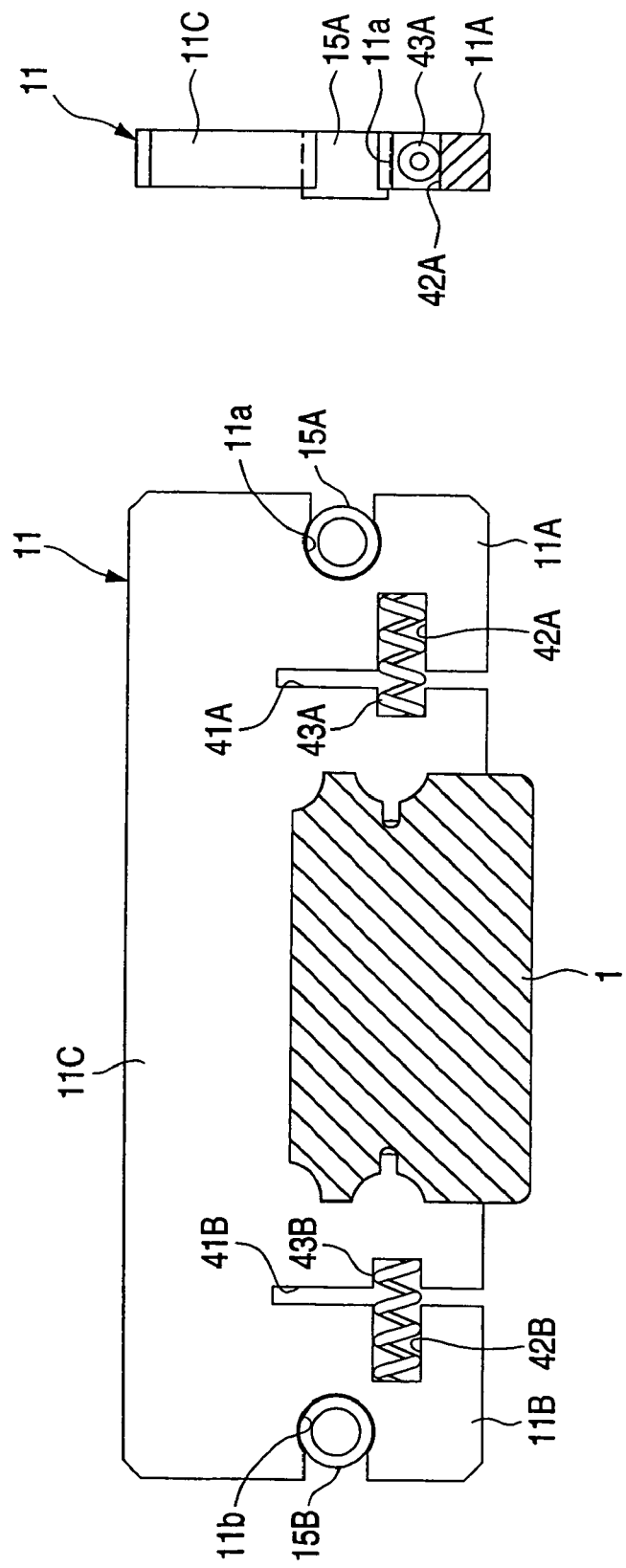
FIGS. 30A and 30B are front views showing an arrangement of a tenth embodiment of the present invention.
Figure 31A:
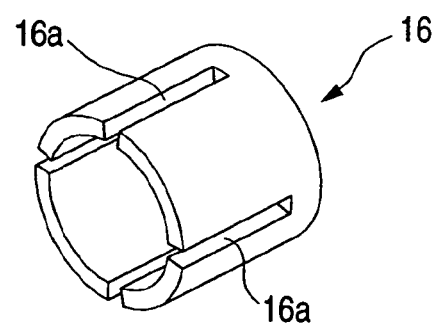
FIGS. 31A to 31D are perspective views showing an eleventh embodiment of the present invention.
Figure 31B:
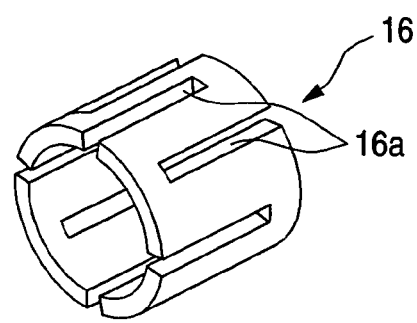
Figure 31C:
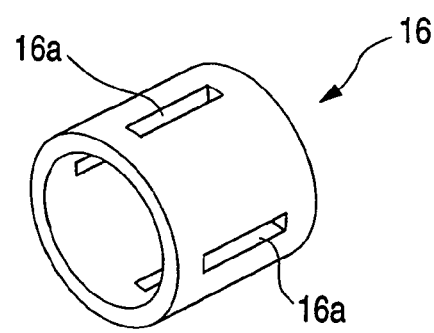
Figure 31D:
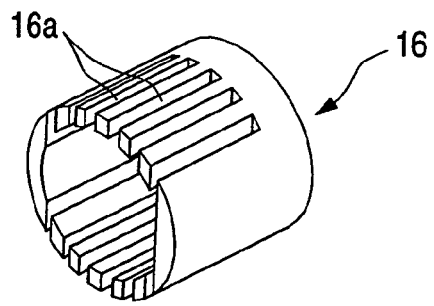

Tenth Embodiment:

FIGS. 30A to 30B are views showing the tenth embodiment of the present invention. FIG. 30A is a front view, and FIG. 30B is a partially cutaway side view. In this connection, like reference characters are used to indicate like parts in the views showing the embodiments described before, and the overlapping explanations are omitted here.

The tenth embodiment is arranged as follows. In the wing portions 11A, 11B of the lubricant-containing member 11, there are formed slits 41A, 41B extending in the upward and downward direction, and ends of the slits 41A, 41B are open to the front end sides of the wing portions 11A, 11B. In the intermediate portions of these slits 41A, 41B, there are formed rectangular through-holes 42A, 42B which are long in the transverse direction. In the through-holes 42A, 42B, there are provided coil springs 43A, 43B, which act as pushing means, the expanding direction of which is aligned in the transverse direction, wherein the coil springs 43A, 43B are set in the through-holes 42A, 42B being a little compressed.

According to the above arrangement, the rigidity of the connecting section 11C in the transverse direction is reduced by the action of the slits 41A, 41B, and elastic restoring forces of the coil springs 43A, 43B are used as pushing forces to press the wing portions 11A, 11b against the guide rail 1. Accordingly, the same effect as that of the second embodiment can be provided by the tenth embodiment.

Eleventh Embodiment:

FIGS. 31A to 31D are views showing the eleventh embodiment of the present invention. FIGS. 31A to 31D are perspective views showing variations of the ring-shaped member 16 to be set in the through-hole 11c of the lubricant-containing member 11. In this connection, the arrangement of the eleventh embodiment is the same as that of the second embodiment except for the structure of the ring-shaped member 16.

In the eleventh embodiment, the ring-shaped member 16, which acts as the pushing means, is made of deformable material such as metal or high polymer (plastics and rubber). On the outer circumferential surface of the ring-shaped member 16, there are formed slits 16a extending in the axial direction. In the same manner as that of each embodiment described before, the inner diameter of the through-hole 11c is made to be a little smaller than the outer diameter of the ring-shaped member 16, so that the ring-shaped member 16 can be inserted into the through-hole 11c under the condition that the diameter of the ring-shaped member 16 is a little reduced. Since the slits 16a are formed in the eleventh embodiment, the ring-shaped member 16 can be more smoothly, elastically deformed in the direction in which the diameter of the ring-shaped member 16 is reduced. Due to the foregoing, an expanding action by which the through-hole 11c is expanded can be stably provided by the ring-shaped member 16 over a long period of time. Accordingly, the wing portions 11A, 11B can be stably pressed against the guide rail 1 over a long period of time, and the same effect as that of the second embodiment can be more positively provided.

In this connection, the diameter expanding action of the ring-shaped member 16 engaged with the through-hole 11c is determined by the size and number of the slits 16a formed in the ring-shaped member 16 and also determined by the wall thickness and material of the ring-shaped member 16. A pushing force to push the wing portions 11A, 11B against the guide rail 1 and a permissible abrasion loss of the lubricant-containing member 11 are determined by the deformation characteristic of the ring-shaped member 16. Accordingly, it is necessary to appropriately determine the above factors by the size and specification of the linear guide apparatus to be used and the rigidity of the lubricant-containing member 11. Consequently, the number of the slits 16a is not limited to the specific embodiments shown in FIGS. 31A to 31D, but it can be determined arbitrarily.

Figure 32A:
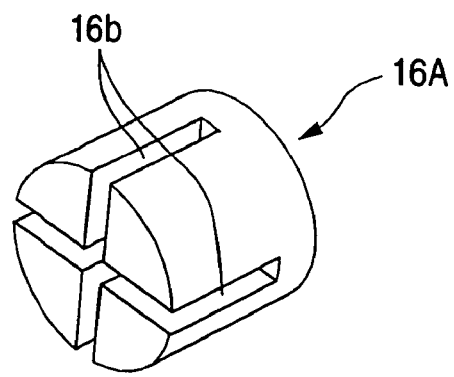
FIGS. 32A to 32C are perspective views showing variations of the eleventh embodiment.
Figure 32B:
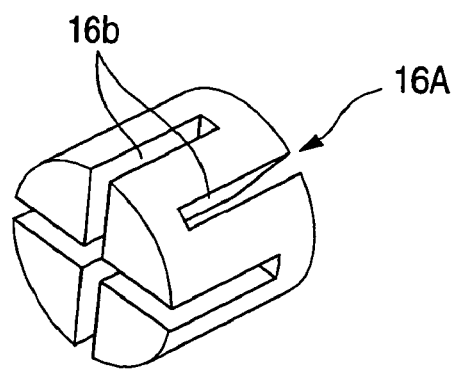
Figure 32C:
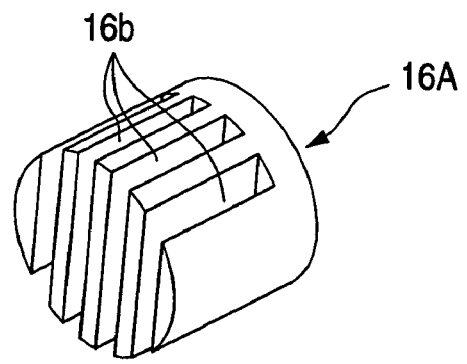

FIGS. 32A to 32C are views showing variations of the eleventh embodiment. In the variations, instead of the ring-shaped member 16, a solid columnar member 16A is used as a pushing means, which is engaged in the through-hole 11c, wherein slits 16b are formed in the columnar member 16A so that the diameter can be expanded and contracted. Even when this columnar member 16A is used, the same effect as that of the ring-shaped members 16 shown in FIGS. 31A to 31D can be provided. In this connection, the diameter expanding action of this columnar member 16 is determined by the material and the size and number of the slits 16b. Accordingly, in the same manner as that of the ring-shaped member 16, it is necessary to appropriately determine the above factors by the size and specification of the linear guide apparatus to be used and the rigidity of the lubricant-containing member 11. Consequently, the number of the slits 16b is not limited to the specific embodiments shown in FIGS. 32A to 32C, but it can be determined arbitrarily.

Figure 33:
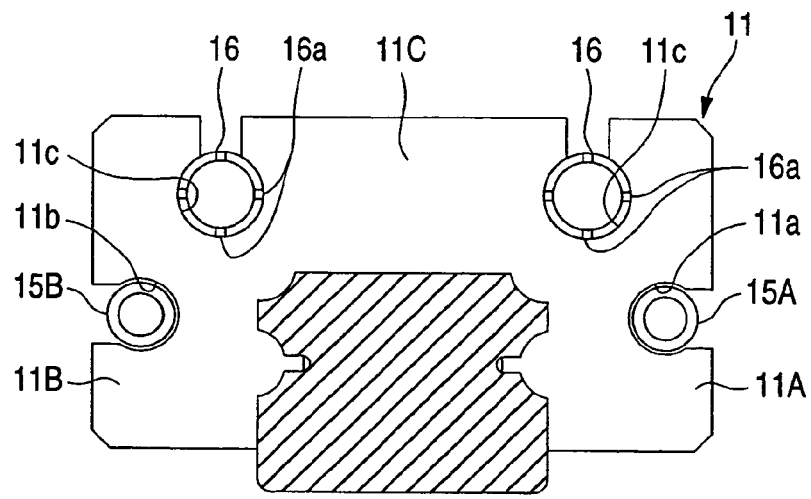
FIG. 33 is a front view showing an arrangement of a twelfth embodiment of the present invention.

Twelfth Embodiment:

FIG. 33 is a view showing the twelfth embodiment of the present invention. FIG. 33 is a front view of the lubricant-containing member 11 when it is arranged striding the guide rail 1. In this connection, like reference characters are used to indicate like parts in the views showing the embodiments described before, and the overlapping explanations are omitted here.

In the twelfth embodiment, there are formed two through-holes 11c at positions in the connecting sections 11C of the lubricant-containing member 11 close to both wing portions 11A, 11B. The ring-shaped member 16 having the slits 16a shown in the eleventh embodiment is inserted into each through-hole 11c.

In the above arrangement in which a plurality of through-holes 11c and ring-shaped members 16 are provided, the connecting section 11C of the lubricant-containing member 11 is curved by a force to expand the diameter of each ring-shaped member 16. Therefore, a pushing force to push the wing portions 11A, 11B against the guide rail 1 is generated. Accordingly, the same effect as that of the second embodiment can be provided. In this connection, the number of the through-holes 11c may be not less than 3, and instead of the ring-shaped member 16, the columnar members 16A shown in FIG. 32 may be inserted into a plurality of through-holes 11c.

In the twelfth embodiment, explanations are made for a case in which the lip portion 13 is formed from rubber containing lubricant. However, since lubricant is fed from the lubricant-containing member 11 to the lip portion 13, the lip portion 13 may be made of NBR (acrylonitrile butadiene rubber) not containing lubricant.

In each embodiment described before, the reinforcing plate 10 may be omitted, and the lubricant-containing member 11 may be interposed between the end cap 2B and side seal 12. Since the lubricant-containing member 11 substantially functions as a sealing device, instead of the side seal 12, a steel plate like the reinforcing plate 10 may be arranged as a reinforcing plate or a protector. Under certain circumstances, instead of the reinforcing plate 10, the side seal 12 may be interposed between the lubricant-containing member 11 and the end cap 2B.

In each embodiment described before, the length V of the ring-shaped members 15A, 15B, 16 is determined to be longer than the thickness W of the lubricant-containing member 11. However, the length V may be the same as the thickness W, or the length V may be a little shorter the thickness W. The essential point to determine the length V and the thickness W is described as follows. A relation between the length V and the thickness W must be maintained so that a deformation of the lubricant-containing member 11 in a direction perpendicular to the axial direction of the guide rail 1 can not be obstructed when the lubricant-containing member 11 is fixed by fastening the attaching screws 17A, 17B.

The linear guide apparatus to which the present invention is applied is not limited to the apparatus of the embodiments described above. For example, the present invention can be applied to a linear guide apparatus in which two or more rolling element rolling grooves are formed on one side, or the rolling elements are not balls but rollers.

As explained above, according to the invention, lubricant can be very stably fed to the lip portion, so that the abrasion of the lip portion can be minimized, and the sealing property of the sealing device can be maintained at a high level over a long period of time. Therefore, the intrusion of foreign object into the linear guide apparatus can be suppressed and the life of the linear guide apparatus can be prolonged.

Further, the lubricant gradually oozing from the lubricant-containing member can be fed to the rolling elements via the guide rail. Accordingly, the rolling elements can be smoothly rolled. In this case, when the side seal is used as a plate member, the abrasion of a contact surface of the side seal with the guide rail can be reduced by the action of lubricant fed from the lubricant-containing member. Therefore, the intrusion of foreign objects into the rolling element rolling groove can be prevented, and the life of the linear guide apparatus can be more prolonged.

Moreover, it is possible to make the lubricant-containing member come into contact with the guide rail at all times. Therefore, the lubricant that has oozed from the lubricant-containing member can be stably fed to the rolling elements via the guide rail. As a result, the rolling elements can be more smoothly rolled.

Still further, the lubricant-containing member can be made to stably come into contact with the guide rail. Therefore, the lubricant can be more stably fed to the rolling elements via the guide rail.

Thirteenth Embodiment:

The thirteenth embodiment of the present invention is shown in FIGS. 39 to 42.

The under seal 21 is composed of an under seal reinforcing plate 22 and an under seal body 23 made of lubricant-containing rubber or synthetic resin which adheres onto the under seal reinforcing plate 22. The under seal reinforcing plate 22 is made of a rectangular steel plate, the length of which is substantially the same as that of the slider 2, and the width of which is a little larger than the width of the lower end face 24 of the slider body 2A. An inner side edge of the under seal reinforcing plate 22 protrudes a little from an end of the lower end face 24 of the slider body 2A. The seal body 23 is made of lubricant-containing synthetic rubber or synthetic resin. The seal body 23 is made to adhere onto the under seal reinforcing plate 22, which is a rectangular plate, by adhesion or baking while the seal body 23 is let to come near the inner edge side of the under seal reinforcing plate 22. At an end edge of the seal body 23, there is provided a seal lip $L_1$ which comes into contact with the side $1b$ of the guide rail 1. In this way, the seal lip portion is composed.

Figure 42:
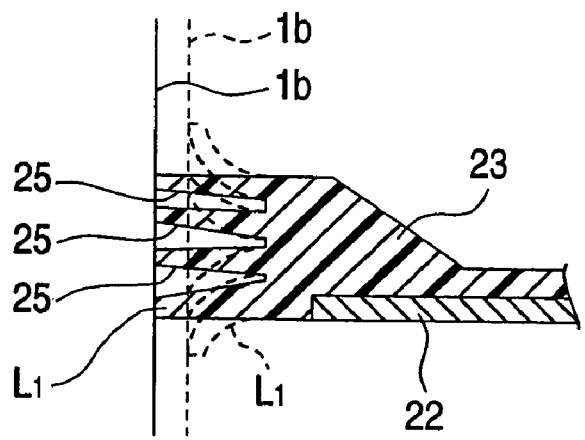
FIG. 42 is an enlarged cross-sectional view of the seal lip of the under seal of the thirteenth embodiment.

As shown in FIG. 42, in a portion of the seal lip $L_1$ which comes into contact with the side surface $1b$ of the guide rail 1, there are provided three cutout portions 25 extending in the longitudinal direction of the seal body 23, wherein these cutout portions 25 are arranged in the thickness direction of the seal body 23. Due to the foregoing arrangement, the seal lip $L_1$ is divided into four pieces.

Figure 39:
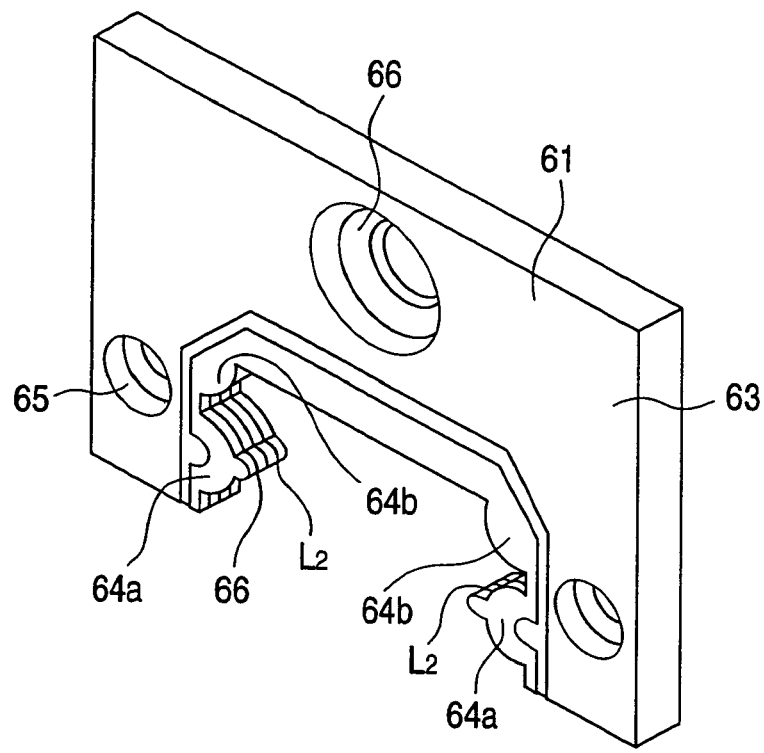
FIG. 39 is an overall perspective view of the side seal composing a portion of the sealing device according to a thirteenth embodiment of the present invention.

As shown in FIG. 39, the side seal 61 is composed in such a manner that a lubricant-containing seal body 63 made of the same material as that of the seal body 23 is made to adhere by adhesion or baking onto an outer surface of the side seal reinforcing plate 62 made of a thin C-shaped steel plate, the shape of which is substantially the same as that of the end cap 2B. In the C-shaped seal body 63, on both side surfaces opposed to each other, there are provided groove sliding protrusions 64a, 64b which are respectively engaged with ball rolling grooves 3 of the guide rail 1, the number of which is two with respect to one side of the guide rail 1. The seal lip $L_2$ is formed on an inner edge of the seal body 63 which comes into contact with the outer surface of the guide rail 1. On the surface of this side seal 61, there is formed one grease nipple attaching hole 66 in conjunction with a plurality of attaching holes 65 through which the side seal 61 is attached to the end cap 2B.

Figure 40:
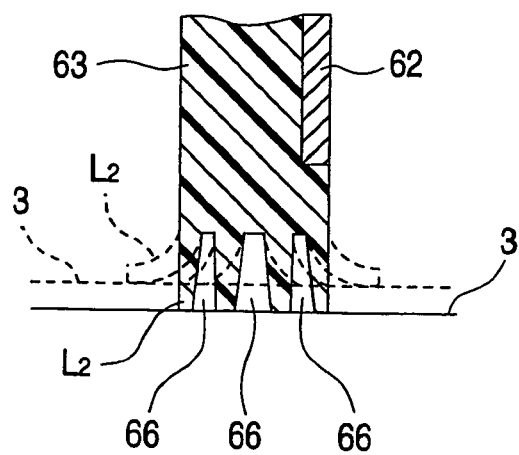
FIG. 40 is an enlarged cross-sectional view of the seal lip of the side seal of the thirteenth embodiment.
Figure 41:
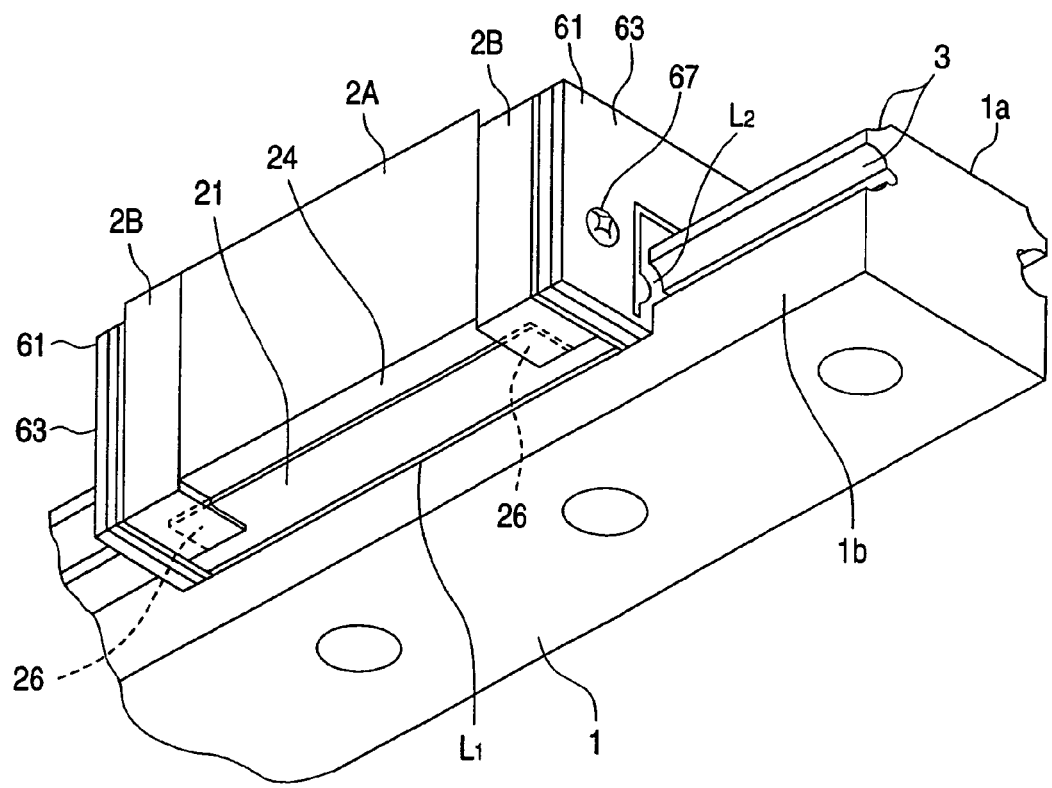
FIG. 41 is a perspective view taken from the lower side of the linear guide apparatus of the thirteenth embodiment.

In a portion of the seal lip $L_2$ which comes into contact with the ball rolling groove 3, that is, in a portion of the groove sliding protrusion 64, as shown in FIGS. 40 and 41, there are formed three cutout portions 66 in the thickness direction of the seal body 63. By the above cutout portions 66, the seal lip $L_2$ is divided into 4 pieces.

Next, the action will be explained as follows.

The under seal 21 is attached as follows.

The slider 2 is previously assembled by attaching the end caps 2B to both end portions of the slider body 2A. The under seal 21 is fixed in such a manner that both end portions of the under seal 21 in the longitudinal direction are engaged with attaching grooves 26 formed on the lower surface of the front and rear end cap 2B while the front end of the seal lip $L_1$ is set inside. The seal body 23 composing the seal lip portion of the under seal 21 allows the seal lip $L_1$, which protrudes inside a little from the side edge of the lower end face 24 of the slider body 2A, to come into contact with the side surface $1b$ of the guide rail 1.

On the other hand, the side seals 61 are respectively attached onto both end faces of the slider 2 when the screws 67 inserted into the attaching holes 65 are engaged with the screw holes (not shown) formed in the end caps 2B. Concerning the seal body 63 composing the seal lip portion of the side seal 61, the seal lips $L_2$ protruding to the inner edge respectively come into contact with the side surface $1b$ of the guide rail 1, the groove surface of the ball rolling groove 3, and the upper surface $1a$ of the guide rail 1.

In this way, by the under seal 21, a lower opening of the gap between the guide rail 1 and the slider 2 can be sealed. Further, by the side seal 61, front and rear openings of the gap between the guide rail 1 and the slider 2 can be sealed. Accordingly, the intrusion of dirt and dust from the front, the rear and the lower portion of the slider 2 can be perfectly blocked.

Further, the self-lubricity is provided to the sliding surfaces of the under seal 21 and the side seal 61 by the lubricant-containing seal bodies 23, 63. Therefore, the sliding resistance of the contact seal is very low, and the abrasion seldom occurs.

Even when this linear guide is used in an environment in which dirt and dust such as chips of wood and chips of casting are scattered, and even when a portion of the lubricant is absorbed by the dirt and dust, lubricant is fed from the lubricant-containing seal bodies 23, 63 at all times. Accordingly, there is no possibility of defective lubrication.

Further, a plurality of cutout portions are formed in the contact portion of the seal lip $L_1$ which comes into contact with the side $1b$ of the guide rail 1, and also a plurality of cutout portions are formed in the contact portion of the seal lip $L_2$ which comes into contact with the upper face and the side of the guide rail 1. By these cutout portions, both seal lips $L_1$ and $L_2$ are respectively divided into 4 pieces. Therefore, either of the pieces of the divided seal lip $L_1$ ($L_2$) is contacted with the outer surface of the guide rail 1, the shape of which is complicated. In this way, the seal lip $L_1$ ($L_2$) can easily follow the shape of the guide rail 1. Even if the under rail 21 or the side rail 61 is dislocated a little, the dislocation can be absorbed by the deformation of the divided portions.

Moreover, the seal lips $L_1$ and $L_2$ are respectively divided into 4 pieces. Therefore, the contact area of the seal lip of the thirtieth embodiment can be more increased than that of the seal lip of the conventional apparatus in which the seal lip is divided into 2 pieces. As a result, quantities of lubricant oozing from seal lips $L_1$ and $L_2$ can be increased. Further, since the numbers of the seal lips $L_1$ and $L_2$ are increased, the dust protecting function of the sealing device can be more enhanced, and the lubricant in the sealing device is prevented from diffusing outside.

Since three cutout portions are formed in each of the seal lips $L_1$ and $L_2$, it is possible to increase the lubricant holding space compared with the conventional apparatus in which one groove is formed in the seal lip. As a result, the sliding property of the seal lips $L_1$ and $L_2$ can be enhanced.

In this connection, each seal lip $L_1$, $L_2$ is provided with three cutout portions and divided into four pieces. However, it should be noted that the present invention is not limited to the above specific embodiment. For example, each seal lip $L_1$, $L_2$ may be provided with two or not less than four cutout portions and divided into three or not less than five pieces.

Only the under seal on one side is shown in FIG. 39. However, the under seals can be attached onto the lower end faces 24 on both sides of the slider body 2A. The under seal 21 is not necessarily attached by the engagement system, but the under seal 21 may be attached by rivets or screws. The essential point is that the sealing device of the present invention is not influenced by the attaching structure of the under seal 21.

Several variations of the side seal are shown in FIGS. 43 to 51.

Figure 43:
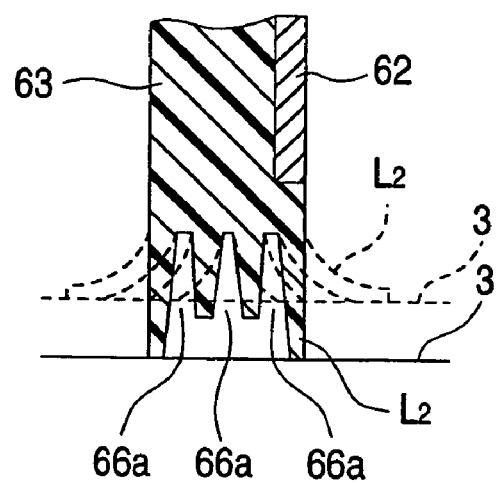
FIG. 43 is a schematic cross-sectional view for explaining a variation of the side seal of the thirteenth embodiment.

The side seal shown in FIG. 43 is arranged as follows. In the same manner as that of the thirtieth embodiment, three cutout portions 66a are formed in the seal lip $L_2$, so that the seal lip $L_2$ is divided into four pieces, and both outside pieces of the divided seal lip $L_2$ are made to be longer than other pieces. Due to the above arrangement, when the divided seal lip $L_2$ are made to come into contact with the guide rail 1, both outside seal lips $L_2$ are greatly extended outside, so that the contact area can be increased. As a result, a quantity of lubricant oozing from the seal lip can be more increased, and the lubricant holding capacity of the seal lip can be more enhanced.

Figure 44:
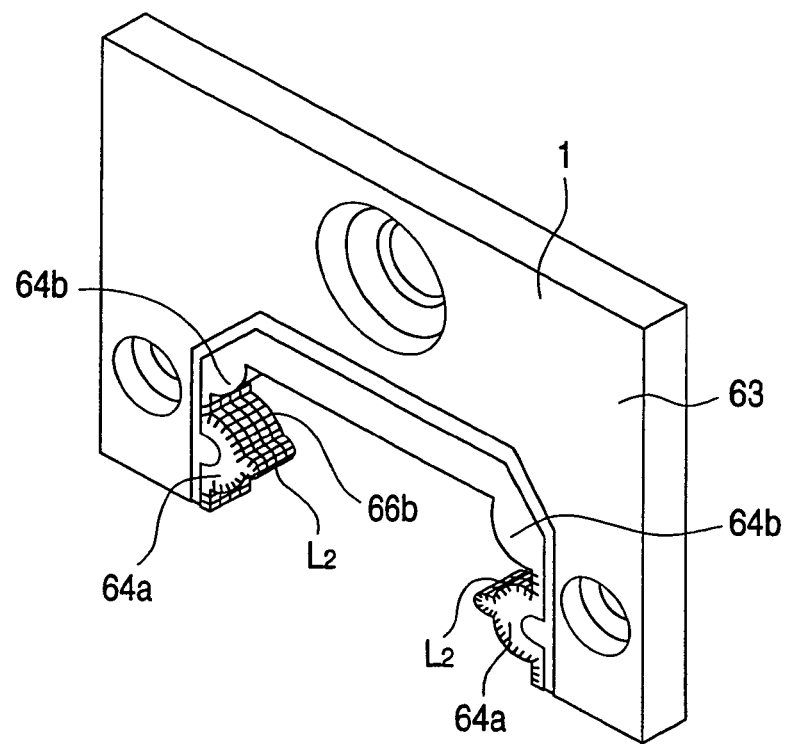
FIG. 44 is a schematic perspective view for explaining another variation of the side seal.
Figure 45:
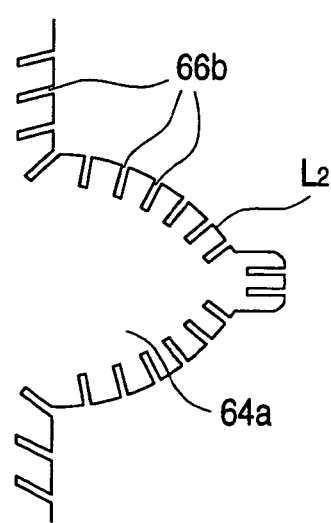
FIG. 45 is a partially enlarged view of the seal lip of the side seal shown in FIG. 44.
Figure 46:
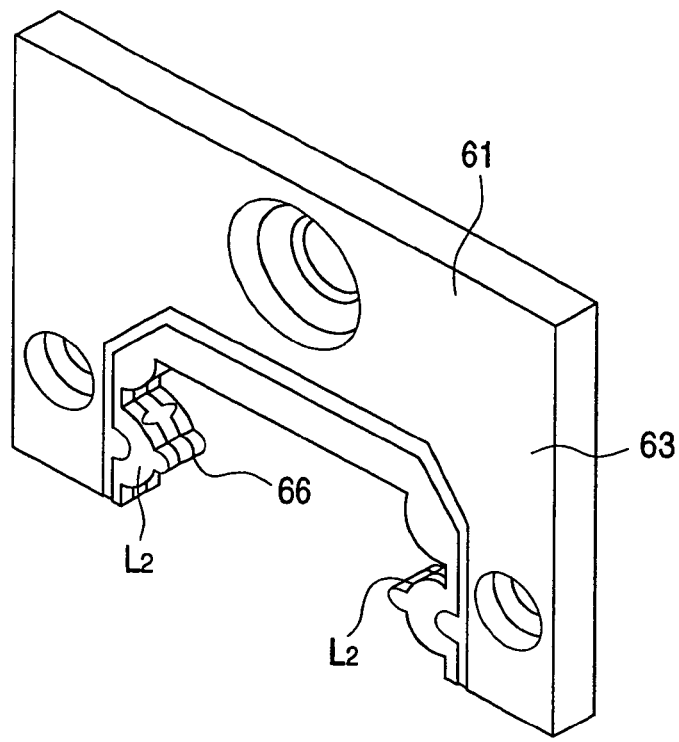
FIG. 46 is a schematic perspective view for explaining another variation of the side seal.
Figure 47:
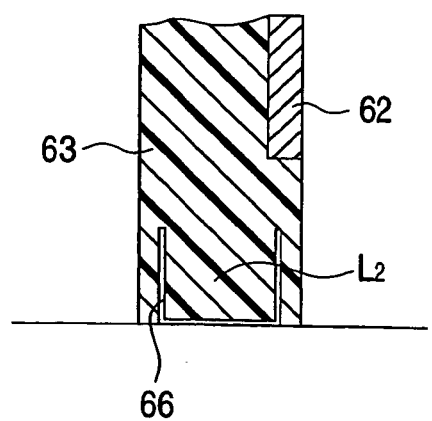
FIG. 47 is a partially enlarged view of the seal lip of the side seal shown in FIG. 46.
Figure 48:
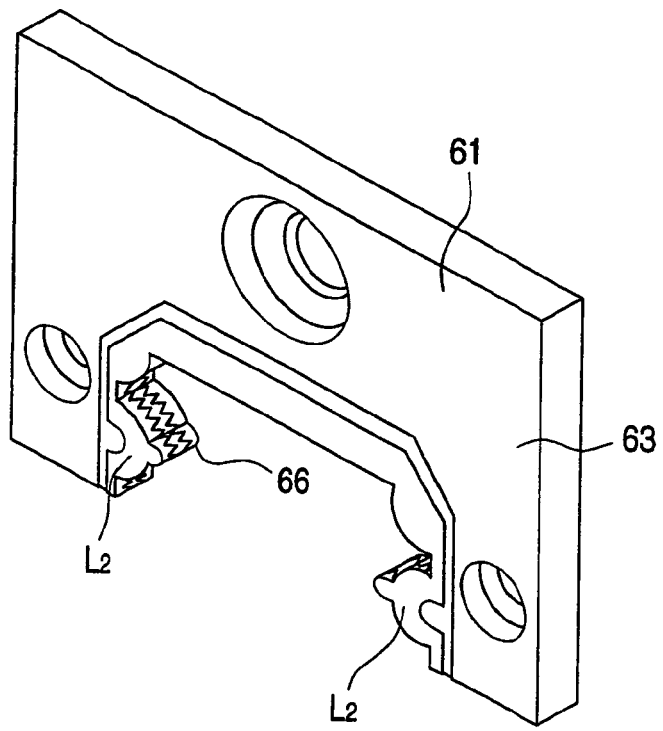
FIG. 48 is a schematic perspective view for explaining another variation of the side seal.
Figure 49:
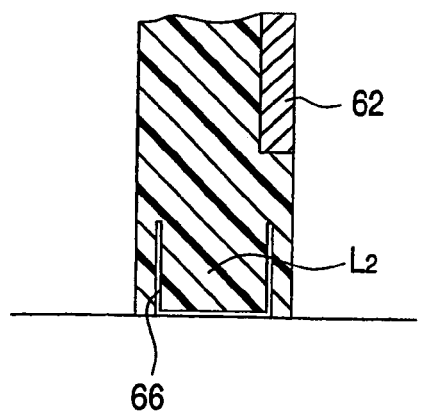
FIG. 49 is an enlarged cross-sectional view of the seal lip portion of the side seal shown in FIG. 48.

The side seal shown in FIGS. 44 and 45 are arranged as follows. Checker-shaped cutout portions 66b are formed in the seal lip $L_2$. Therefore, the seal lip $L_2$ is divided into a large number of pieces by the checker-shaped cutout portions 66b. Due to the foregoing arrangement, the number and the contact area of the pieces of the divided seal lip $L_2$ can be more increased.

Figure 50:
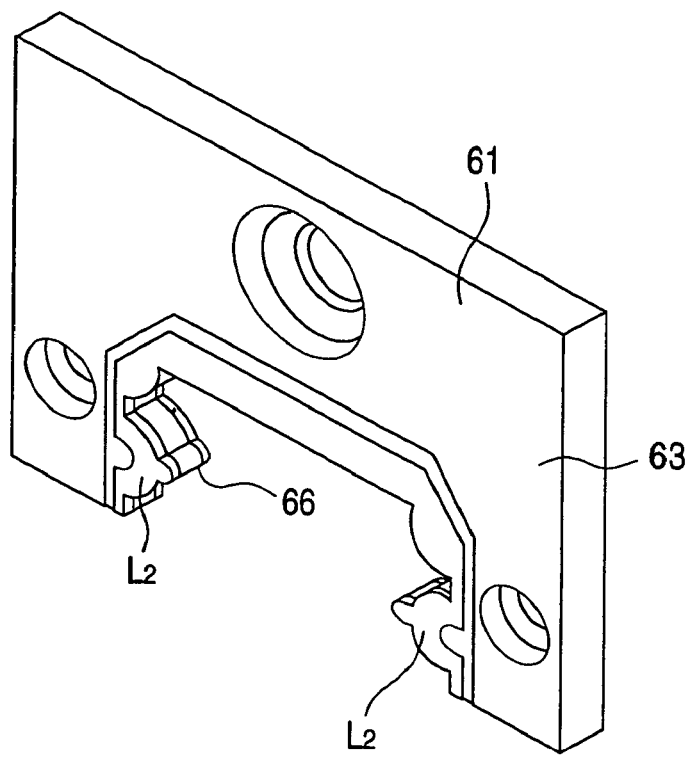
FIG. 50 is a schematic perspective view for explaining another variation of the side seal.
Figure 51:
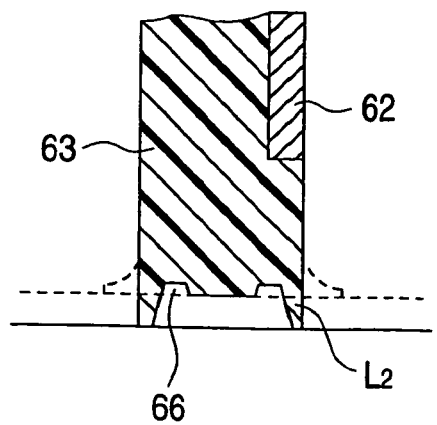
FIG. 51 is an enlarged cross-sectional view of the seal lip portion of the side seal shown in FIG. 50.
Figure 52:
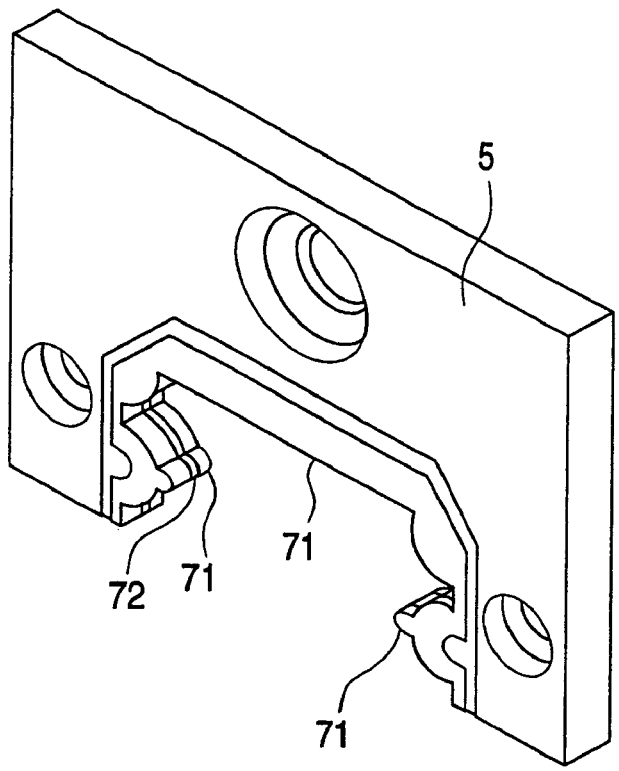
FIG. 52 is an overall perspective view of another conventional side seal.
Figure 53A:
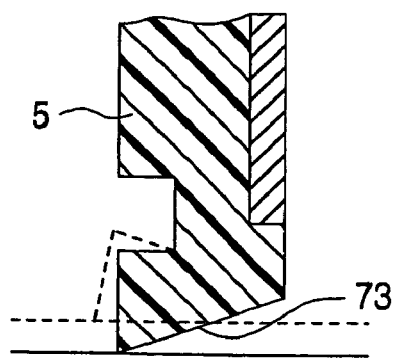
FIGS. 53A and 53B are enlarged cross-sectional views of two types of the seal lip portion of the side seal shown in FIG. 52.
Figure 53B:
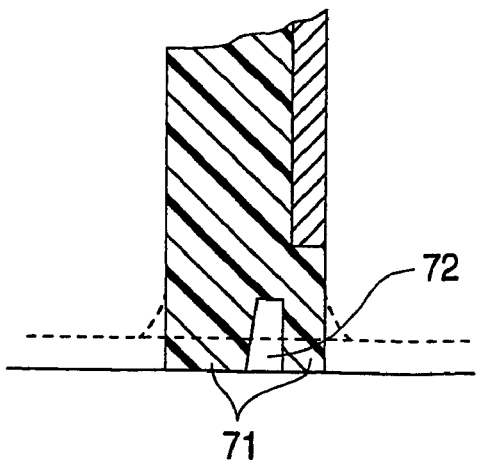

Cutout portions 66 formed in the side seals shown in FIGS. 46 to 49 are composed of not only simple straight lines but also curves. By the combination of straight lines and curves, zigzag cutout portions are formed. The side seal shown in FIGS. 50 and 51 is arranged as follows. When the seal lip portions $L_2$ of the side seal comes into contact with the guide rail 1, the cutout portion 66 is divided into two (a plural number). This arrangement is effective when the rigidity of the lip portion $L_2$ is required by increasing the width of its central portion.

As long as the slider is attached to the guide rail in such a manner that the slider strides the guide rail, the linear guide apparatus of the present invention is not limited to the specific type. For example, in the embodiments described above, the number of the ball rolling grooves 3 on one side is two, however, it is possible to apply the present invention to an apparatus, the number of the ball rolling grooves on one side of which is one or not less than three. In this case, of course, it is possible to form the sliding protrusions 64a, 64b of the side seal 61 in accordance with the ball rolling groove 3.

In the embodiments described above, balls are used as the rolling elements. However, it should be noted that the present invention can be applied to an apparatus in which rollers are used as the rolling elements.

A direction of the cutout portions formed in the seal lips $L_1$, $L_2$ is not particularly limited. For example, the cutout portions may be formed in an arbitrary direction such as a direction oblique with respect to the axial direction of the guide rail.

In the embodiments described above, the cutout portions are formed on the overall inner circumferential wall of the side seal. However, the present invention is not limited to the specific embodiment. When necessary, the cutout portions may be formed only in a portion of the ball rolling groove 3 or on an upper surface of the guide rail 1. In this way, the cutout portions may be formed only in a portion of the side rail.

In the embodiments described above, the main purpose of the side seal is to accomplish the sealing function. However, it is possible to adopt the following arrangement. In the slider, there is provided a conventional side seal to which a piece of nitrile rubber or urethane rubber is attached by melting. Different from the above side seal, there is provided in series a sealing device of the present invention. This sealing device may be used as a lubricant feed device to feed lubricant to the seal lip portion and the rolling elements of the conventional side seal.

There are formed a plurality of cutout portions in a portion of the seal lip which comes into pressure contact with an outer surface of the guide rail. Accordingly, either of the divided portions of the seal lip comes into contact with an outer surface of the guide rail, the shape of which is complicated. Therefore, the seal lip easily follows the complicated shape of the guide rail.

Further, there are provided a plurality of cutout portions in the seal lip portion. Accordingly, compared with the conventional sealing device in which one groove is formed in the seal lip portion, the contact area of the seal lip which comes into contact with the guide rail can be increased. As a result, it is possible to increase a quantity of lubricant oozing from the seal lip portion. Moreover, the number of the pieces of the divided seal lip can be increased more than the number of the pieces of the conventional seal lips. Accordingly, the dust protecting function of the sealing device can be more enhanced, and the lubricant in the sealing device is prevented from diffusing outside.

Since a plurality of cutout portions are formed in the seal lip, it is possible to increase the lubricant holding space compared with the conventional sealing device in which one groove is formed in the seal lip. As a result, the sliding property of the seal lip can be enhanced.

What is claimed is:

1. A linear guide apparatus comprising:
    an axially extending guide rail having a first rolling groove on its outer surface;
    a slider engaged with the guide rail and having a second rolling groove, rolling element return grooves and curved grooves, the second rolling groove confronting the first rolling groove, the rolling element return grooves being coupled to both end portions of the second rolling groove through the curved grooves, respectively;
    a plurality of rolling elements loaded into the slider to be made circulatable through the second rolling groove, the curved grooves, and the rolling element return grooves; and
    a sealing device fixed to the slider in slidable contact with the guide rail for sealing a clearance existing between the guide rail and the slider, the sealing device comprising:
    a lubricant-containing polymer member formed of a synthetic resin containing a lubricant, and having a contact portion contacting with the guide rail to surround the guide rail, both wing portions, and a connecting portion connecting the wing portions to be C-shaped substantially; and
    a first plate member fitted to the lubricant-containing polymer member, wherein the lubricant-containing polymer member is interposed between the slider and the first plate member,
    wherein the lubricant-containing polymer member has an inner bottom face arc-shaped in the connecting portion which elastically protrudes toward the guide rail.

2. A linear guide apparatus comprising:
    an axially extending guide rail having a first rolling groove on its outer surface;
    a slider engaged with the guide rail and having a second rolling groove, rolling element return grooves and curved grooves, the second rolling groove confronting the first rolling groove, the rolling element return grooves being coupled to both end portions of the second rolling groove through the curved grooves, respectively;

a plurality of rolling elements loaded into the slider to be made circulatable through the second rolling groove, the curved grooves, and the rolling element return grooves; and a sealing device fixed to the slider an slidable contact with the guide rail for sealing a clearance existing between the guide rail and the slider, the sealing device comprising:

a lubricant-containing polymer member formed of a synthetic resin containing a lubricant, and having a contact portion contacting with the guide rail to surround the guide rail, both wing portions, and a connecting portion connecting the wing portions to be C-shaped substantially; and a first plate member fitted to the lubricant-containing polymer member, wherein the lubricant-containing polymer member is interposed between the slider and the first plate member, wherein the sealing device comprises a pair of first recesses formed in the respective wing portions for fixing the lubricant-containing polymer member to the slider and a pair of first cylindrical members inserted to the respective first recesses.

3. The linear guide apparatus of claim 2, wherein the lubricant-containing polymer member includes a second recess formed in the connecting portion, and the sealing device comprises a second cylindrical member inserted to the second recess, the second cylindrical member having an outer diameter larger than an inner diameter of the second recess.

4. The linear guide apparatus of claim 3, wherein the second cylindrical member has an axial length larger than a thickness of the lubricant-containing polymer member.

5. The linear guide apparatus of claim 2, wherein each of the first cylindrical members has a ring shape.

6. The linear guide apparatus of claim 2, wherein each of the first cylindrical members has an axial length larger than a thickness of the lubricant-containing polymer member.

7. A linear guide apparatus comprising:

an axially extending guide rail having a first rolling groove on its outer surface;

a slider engaged with the guide rail and having a second rolling groove, rolling element return grooves and curved grooves, the second rolling groove confronting the first rolling groove, the rolling element return grooves being coupled to both end portions of the second rolling groove through the curved grooves, respectively;

a plurality of rolling elements loaded into the slider to be made circulatable through the second rolling groove, the curved grooves, and the rolling element return grooves; and a sealing device fixed to the slider in slidable contact with the guide rail for sealing a clearance existing between the guide rail and the slider, the sealing device comprising:

a lubricant-containing polymer member formed of a synthetic resin containing a lubricant, and having a contact portion contacting with the guide rail to surround the guide rail, both wing portions, and a connecting portion connecting the wing portions to be C-shaped substantially; and a first plate member fitted to the lubricant-containing polymer member, wherein the lubricant-containing polymer member is interposed between the slider and the first plate member, wherein the lubricant-containing polymer member has an elastic member to press against the guide rail.

8. The linear guide apparatus of claim 7, wherein the elastic member extends along the contact portion, the elastic member being fitted closed to the contact portion.

9. A linear guide apparatus comprising:

an axially extending guide rail having a first rolling groove on its outer surface;

a slider engaged with the guide rail and having a second rolling groove, rolling element return grooves and curved grooves, the second rolling groove confronting the first rolling groove, the rolling element return grooves being coupled to both end portions of the second rolling groove through the curved grooves, respectively;

a plurality of rolling elements loaded into the slider to be made circulatable through the second rolling groove, the curved grooves, and the rolling element return grooves; and a sealing device fixed to the slider in slidable contact with the guide rail for sealing a clearance existing between the guide rail and the slider, the sealing device comprising:

a lubricant-containing polymer member formed of a synthetic resin containing a lubricant, and having a contact portion contacting with the guide rail to surround the guide rail, both wing portions, and a connecting portion connecting the wing portions to be C-shaped substantially; and a first plate member fitted to the lubricant-containing polymer member, wherein the lubricant-containing polymer member is interposed between the slider and the first plate member, wherein the lubricant-containing polymer member comprises a plurality of seal lips formed in the contact portion to contact the guide rail slidingly, the seal lips comprising a plurality of cutout portions arranged in a thickness direction of the sealing device.

* * * * *